(12) United States Patent
Findley et al.

(10) Patent No.: US 11,708,222 B2
(45) Date of Patent: Jul. 25, 2023

(54) LUMBER HANDLING AND CUTTING APPARATUS

(71) Applicant: Illinois Tool Works Inc., Glenview, IL (US)

(72) Inventors: Ronald E. Findley, Arlington, TX (US); Mark K. Gipson, Justin, TX (US)

(73) Assignee: Illinois Tool Works Inc., Glenview, IL (US)

( * ) Notice: Subject to any disclaimer, the term of this patent is extended or adjusted under 35 U.S.C. 154(b) by 562 days.

(21) Appl. No.: 16/855,490

(22) Filed: Apr. 22, 2020

(65) Prior Publication Data

US 2020/0339360 A1 Oct. 29, 2020

Related U.S. Application Data

(60) Provisional application No. 62/839,290, filed on Apr. 26, 2019.

(51) Int. Cl.
*B65G 47/24* (2006.01)
*B41J 3/407* (2006.01)
*B27B 31/00* (2006.01)
*B27B 25/06* (2006.01)
*B27B 27/10* (2006.01)

(52) U.S. Cl.
CPC ............. *B65G 47/24* (2013.01); *B27B 25/06* (2013.01); *B27B 31/003* (2013.01); *B41J 3/4073* (2013.01); *B27B 27/10* (2013.01)

(58) Field of Classification Search
CPC ............ B26D 1/109; B26D 2001/0066; B23D 21/00; B65G 47/24; B27B 25/06; B27B 31/003; B27B 27/10; B41J 3/4073
See application file for complete search history.

(56) References Cited

U.S. PATENT DOCUMENTS

| | | | |
|---|---|---|---|
| 4,269,303 A * | 5/1981 | Cornell | B65G 37/00 198/817 |
| 6,072,890 A | 6/2000 | Savard et al. | |
| 7,347,232 B2 | 3/2008 | Edwards | |
| 7,631,744 B2 * | 12/2009 | Brommer | B42C 19/08 198/370.09 |
| 9,751,113 B2 | 9/2017 | Hougen et al. | |
| 2003/0009258 A1 * | 1/2003 | Conry | B41J 3/407 700/213 |

(Continued)

OTHER PUBLICATIONS

Alpine AutoMill HP high-performance component saw brochure, by Alpine an ITW Company, published Aug. 2016, 2 pages.

*Primary Examiner* — Evan H Macfarlane
*Assistant Examiner* — Fernando A Ayala
(74) *Attorney, Agent, or Firm* — Neal, Gerber & Eisenberg LLP

(57) ABSTRACT

Various embodiments of the present disclosure provide a lumber handling and cutting apparatus, including an incoming material conveyor assembly, a material infeed assembly adjacent to the incoming material conveyor assembly, a cutting assembly adjacent to the material infeed assembly, a material outfeed assembly adjacent to the cutting assembly, an outgoing material conveyor assembly adjacent to the cutting assembly, and a printer assembly adjacent to the incoming material conveyor assembly and the material infeed assembly.

12 Claims, 46 Drawing Sheets

(56) References Cited

U.S. PATENT DOCUMENTS

| | | | |
|---|---|---|---|
| 2004/0069106 A1* | 4/2004 | McAdoo | B27B 25/02 |
| | | | 83/404 |
| 2009/0120249 A1* | 5/2009 | Gauss | B41J 3/28 |
| | | | 82/162 |
| 2011/0253261 A1* | 10/2011 | McGehee | B23D 45/042 |
| | | | 144/286.5 |
| 2013/0008333 A1* | 1/2013 | Peter | B41J 25/304 |
| | | | 101/484 |

* cited by examiner

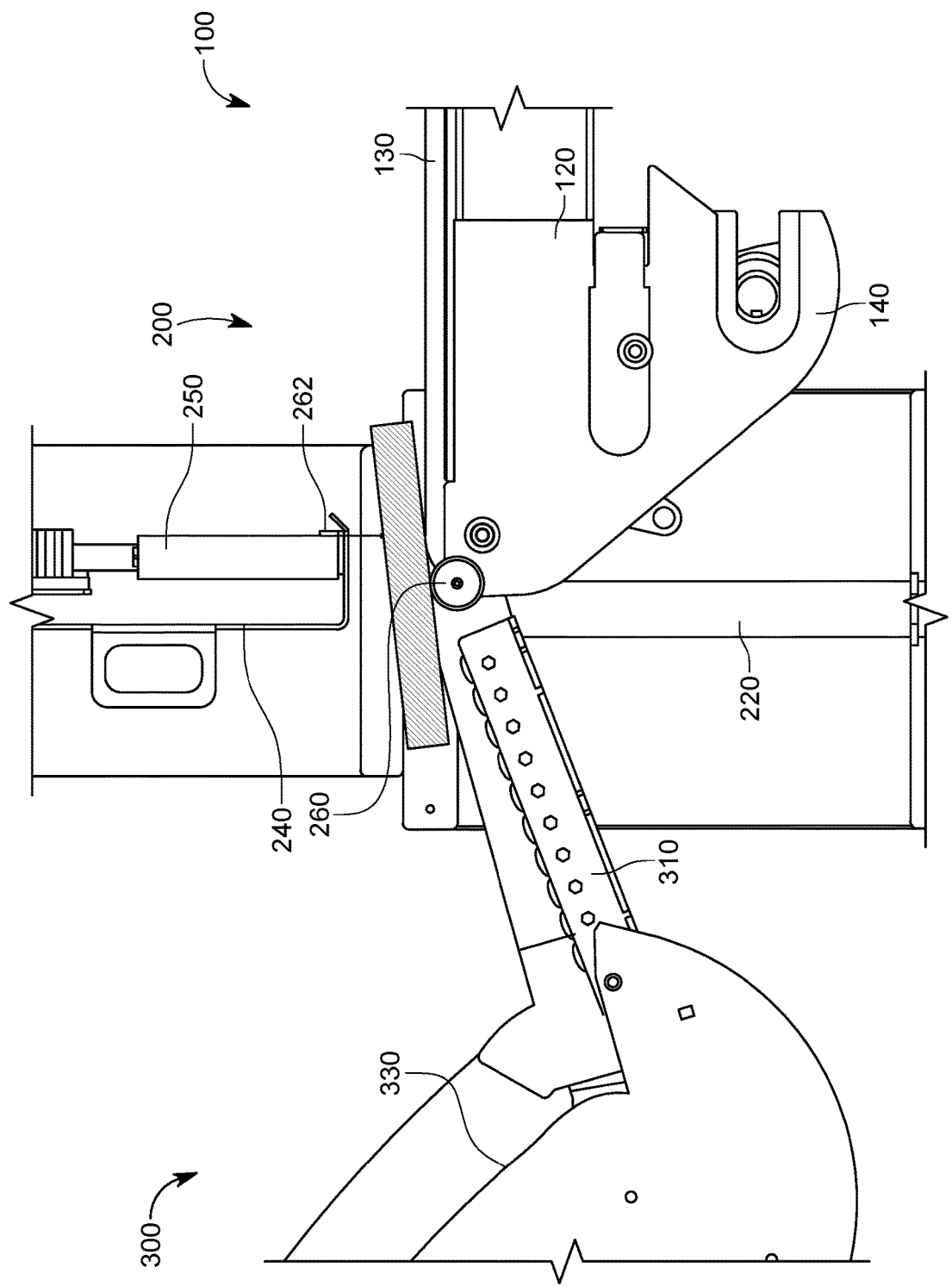

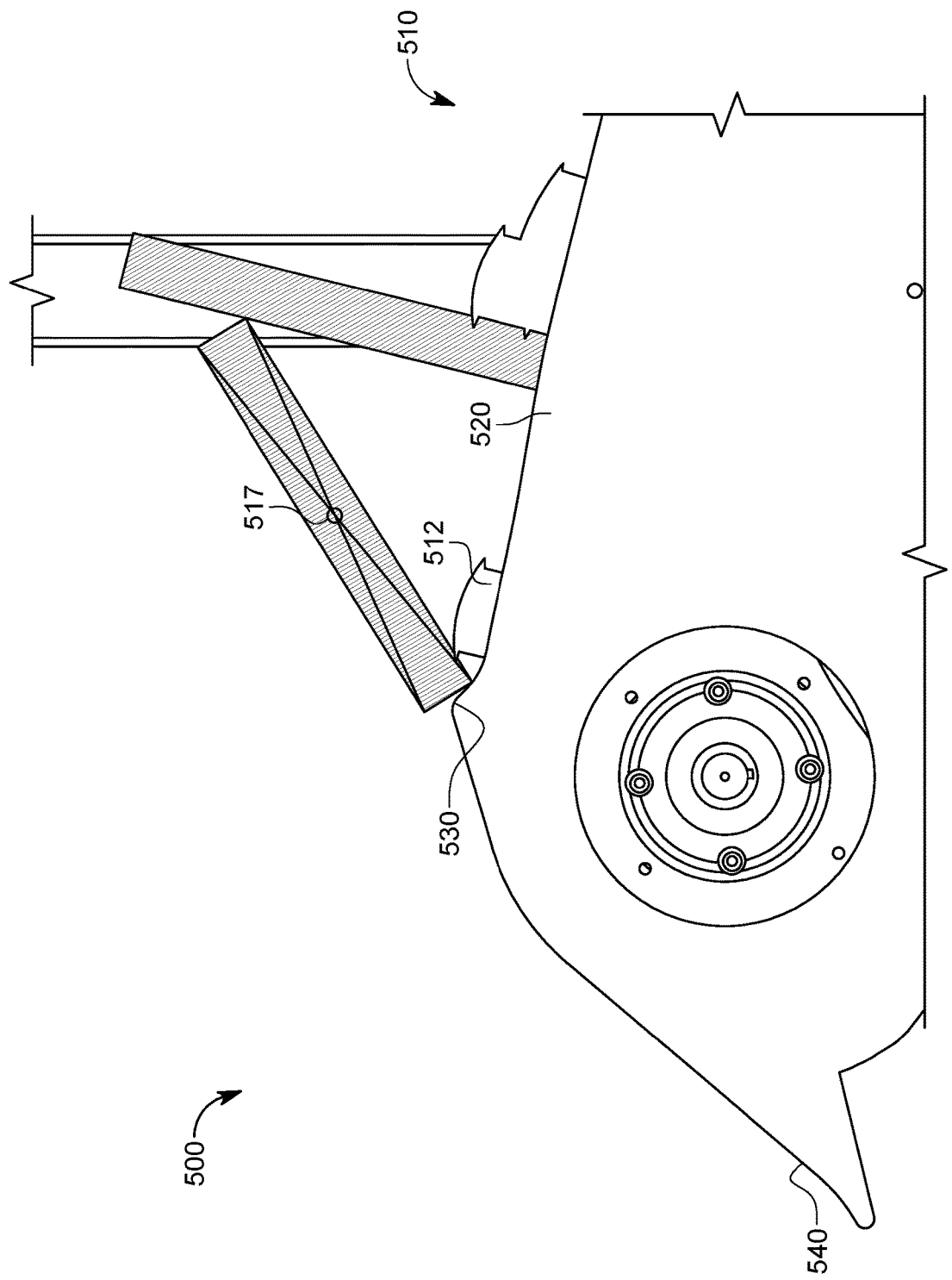

LUMBER HANDLING AND CUTTING APPARATUS

PRIORITY

This application claims priority to and the benefit of U.S. Provisional Patent Application Ser. No. 62/839,290, filed Apr. 26, 2019, the entire contents of which is incorporated herein by reference.

CROSS-REFERENCE TO RELATED APPLICATIONS

This application is related to the following commonly owned co-pending patent applications: U.S. application Ser. No. 16/855,498, entitled "LUMBER HANDLING AND CUTTING APPARATUS"; U.S. application Ser. No. 16/855,484, entitled "LUMBER HANDLING AND CUTTING APPARATUS"; and U.S. application Ser. No. 16/855,473, entitled "LUMBER HANDLING AND CUTTING APPARATUS".

BACKGROUND

Generally, lumber saws are configured to handle and cut lumber having a variety of different characteristics (such as lumber boards of different sizes, shapes, and/or dimensions). Lumber saws and related intake and outtake feeders typically need to be adjusted and/or reconfigured between processing lumber boards having one or more different characteristics.

Accordingly, there is a continuing need for mechanisms for better automating infeed and outfeeds for saws that handle lumber (such as lumber boards having different characteristics) that provide time and cost savings, as well as improved safety operators of such equipment.

SUMMARY

Various embodiments of the present disclosure provide various lumber handling and cutting apparatus including an incoming material conveyor assembly, a material infeed assembly adjacent to the incoming material conveyor assembly, a cutting assembly adjacent to the material infeed assembly, a material outfeed assembly adjacent to the cutting assembly, an outgoing material conveyor assembly adjacent to the cutting assembly, and a printer assembly adjacent to the incoming material conveyor assembly and the material infeed assembly.

In various embodiments of the present disclosure, the printer assembly of the lumber handling and cutting apparatus includes a printer support base, a printer support frame supported by and suitably connected to the printer support base, a printer support arm supported by and suitably connected to the printer support frame, a print head mounting bracket connected to the printer support arm, a print head supported by and suitably connected to the print head mounting bracket such that the print head is configured to print on a lumber board as the lumber board passes the print head. In various embodiments of the present disclosure, the printer assembly further includes a multi-size board alignment assembly at an end of the incoming material conveyor assembly, wherein the multi-size board alignment assembly is configured to align and particularly square the lumber board with respect to the print head prior to the print head printing on the lumber board.

In various embodiments of the present disclosure, the material infeed assembly of the lumber handling and cutting apparatus includes an infeed conveyor adjacent to the incoming material conveyor assembly, an actuator mounting bracket suitably connected to the infeed conveyor, an actuator member supported by and suitably connected to the actuator mounting bracket, and a lifting member suitably connected to the actuator member, wherein the lifting member is configured to engage with lumber board to re-orient the lumber board (if necessary) before the lumber board is fed into the cutting assembly.

In various embodiments, the material infeed assembly of the lumber handling and cutting apparatus includes an infeed conveyor adjacent to the incoming material conveyor assembly, a stop member connected to the infeed conveyor, a dogged chain conveyor adjacent to the end of the infeed conveyor and the stop member, and a support member suitably connected to the infeed conveyor, the support member configured to support a lumber board such that the lumber board does not fall off the infeed conveyor as the lumber board is fed from the infeed conveyor to the dogged chain conveyor.

In various embodiments, the material outfeed assembly of the lumber handling and cutting apparatus includes an outfeed conveyor adjacent to the cutting assembly, an outfeed orientation member suitably attached on either side of the outfeed conveyor, and an outfeed orienter defined in the outfeed orientation member, wherein the outfeed orienter is configured to orient or re-orient a lumber board on a desired side as the lumber board is fed out from the material outfeed assembly.

Other objects, features, and advantages of the present disclosure will be apparent from the following detailed disclosure and accompanying drawings.

BRIEF DESCRIPTION OF THE FIGURES

FIGS. 4A to 4E are enlarged fragmentary side views of the incoming material conveyor assembly, the printer assembly, and the material infeed assembly of the lumber handling and cutting apparatus of FIG. 1A, showing the progression through the printer assembly and into the infeed material assembly of a larger dimension lumber board.

FIGS. 14A to 14E are enlarged fragmentary side views of the material outfeed assembly of the lumber handing and cutting apparatus of FIG. 1A, showing the reorientation by the material outfeed assembly of a larger dimension lumber board after processing by the cutting assembly.

DETAILED DESCRIPTION

Figure 1A:
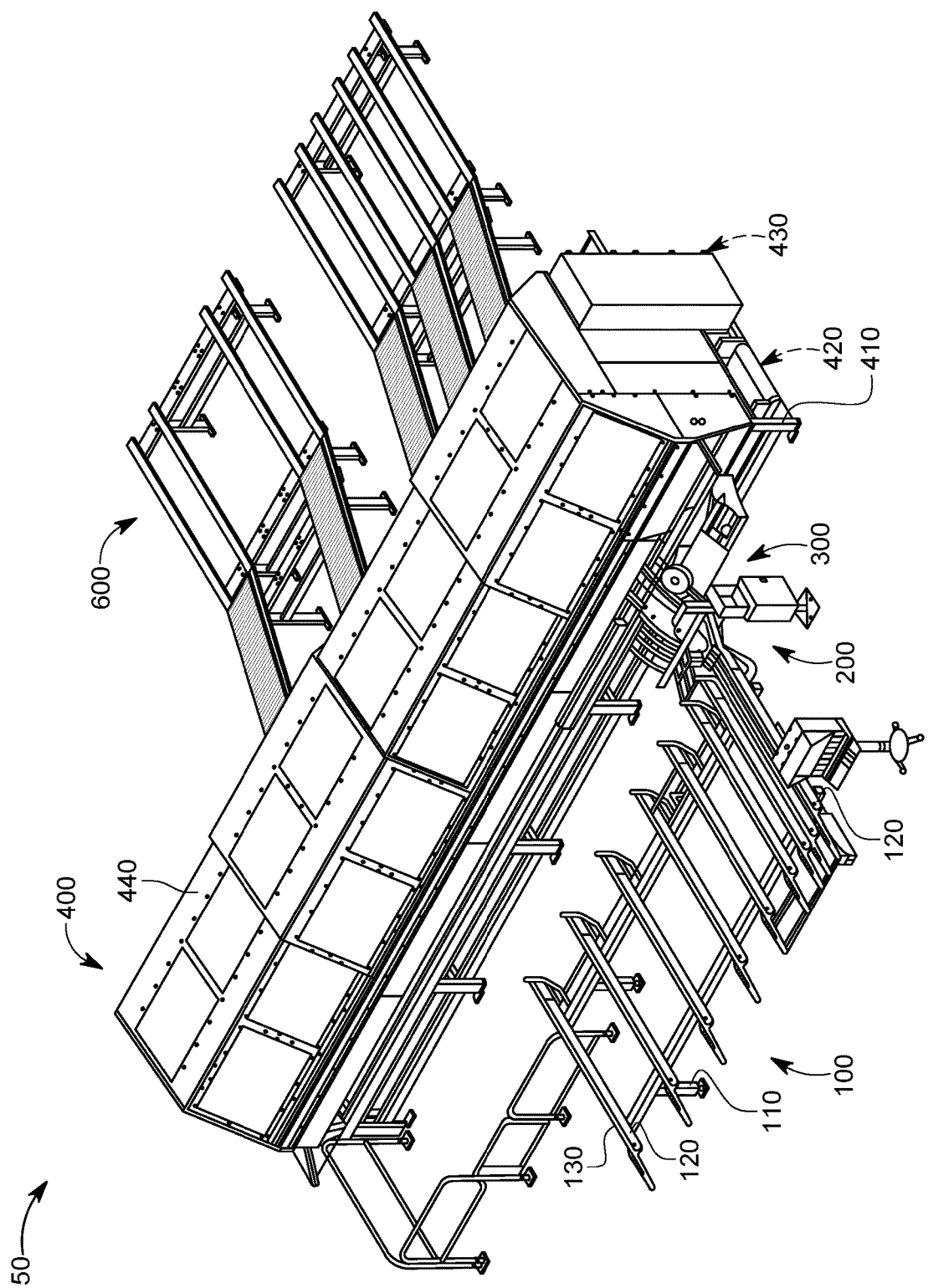
FIG. 1A is a top perspective view of one example embodiment of a lumber handling and cutting apparatus of the present disclosure.
Figure 1B:
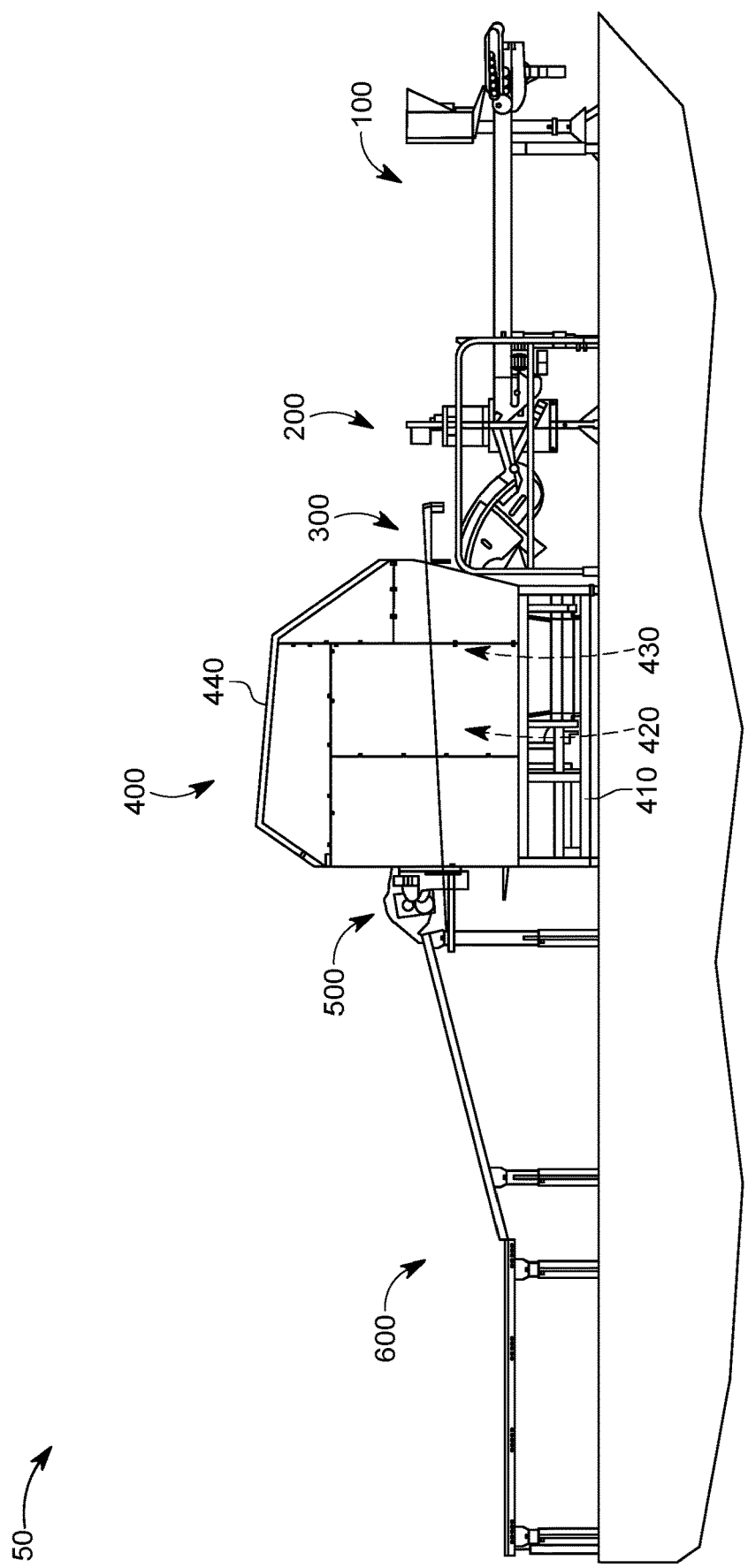
FIG. 1B is a side view of the lumber handling and cutting apparatus of FIG. 1A.
Figure 1C:
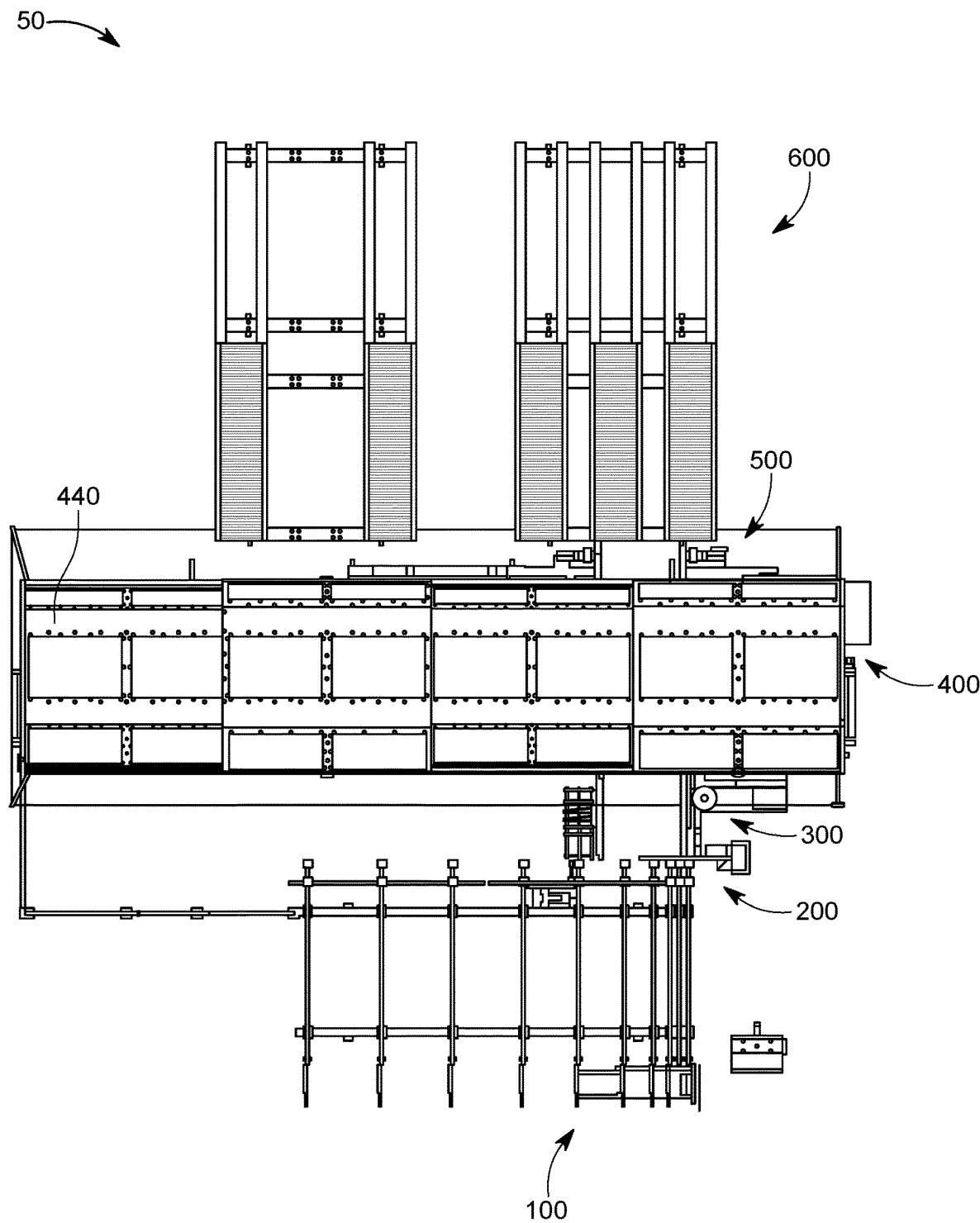
FIG. 1C is a top view of the lumber handling and cutting apparatus of FIG. 1A.
Figure 1D:
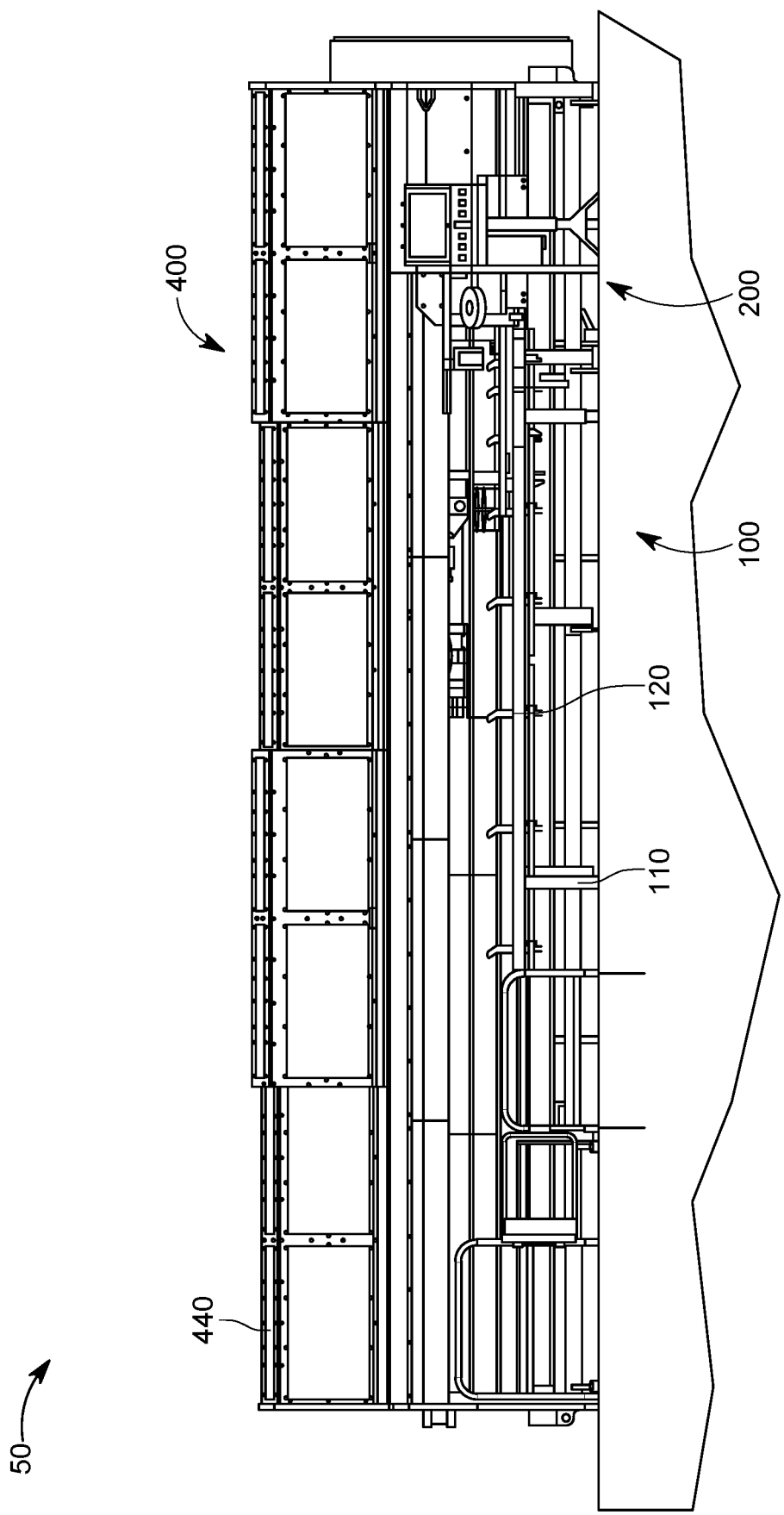
FIG. 1D is a front view of the lumber handling and cutting apparatus of FIG. 1A.
Figure 2:
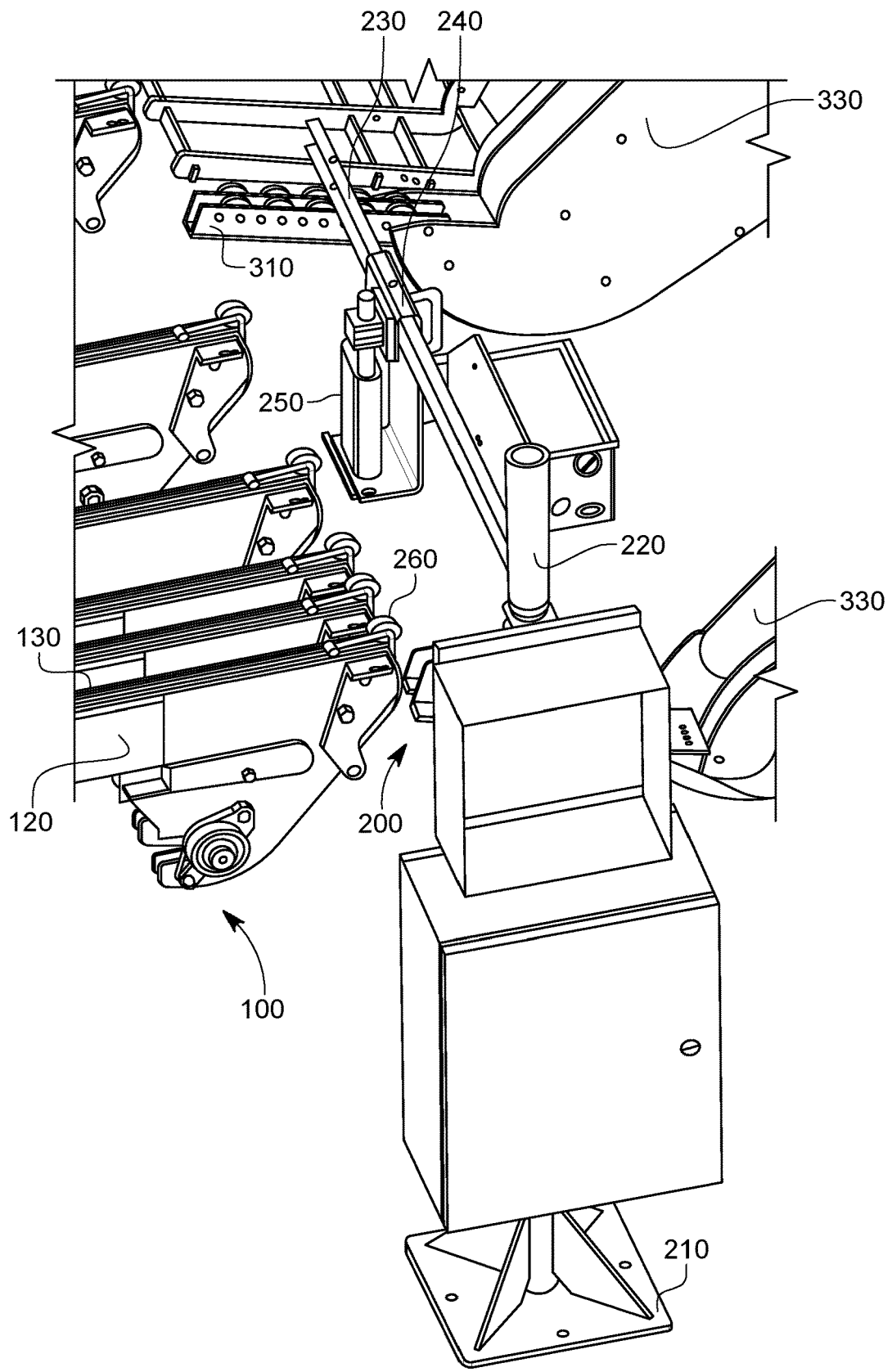
FIG. 2 is an enlarged fragmentary top perspective view of the printer assembly of the lumber handling and cutting apparatus of FIG. 1A, showing the printer assembly positioned at a transition point between the incoming material conveyor assembly and the material infeed assembly.
Figure 3A:
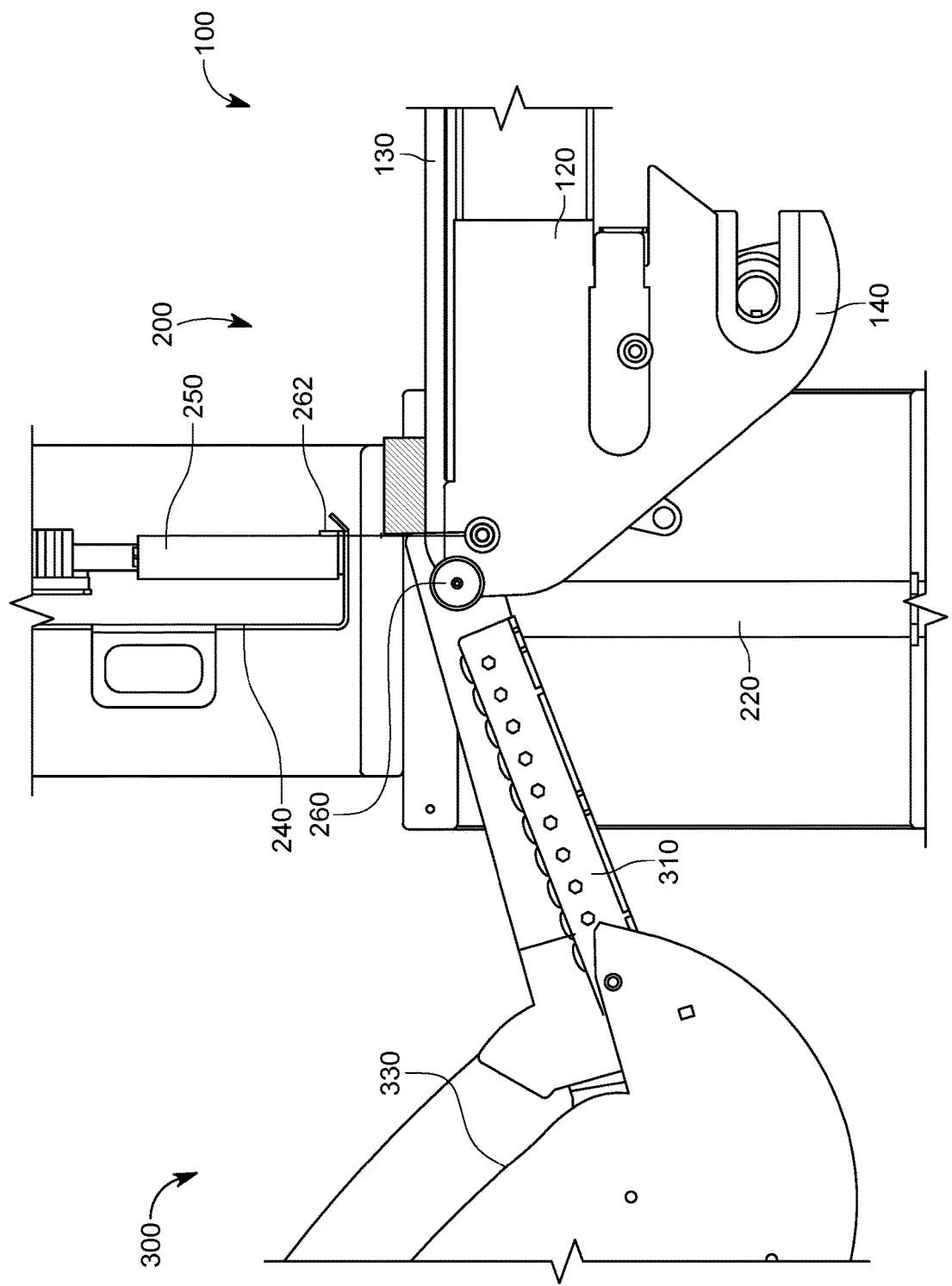
FIGS. 3A to 3E are enlarged fragmentary side views of the incoming material conveyor assembly, the printer assembly, and the material infeed assembly of the lumber handling and cutting apparatus of FIG. 1A, showing the progression through the printer assembly and into the infeed material assembly of a smaller dimension lumber board.
Figure 3B:
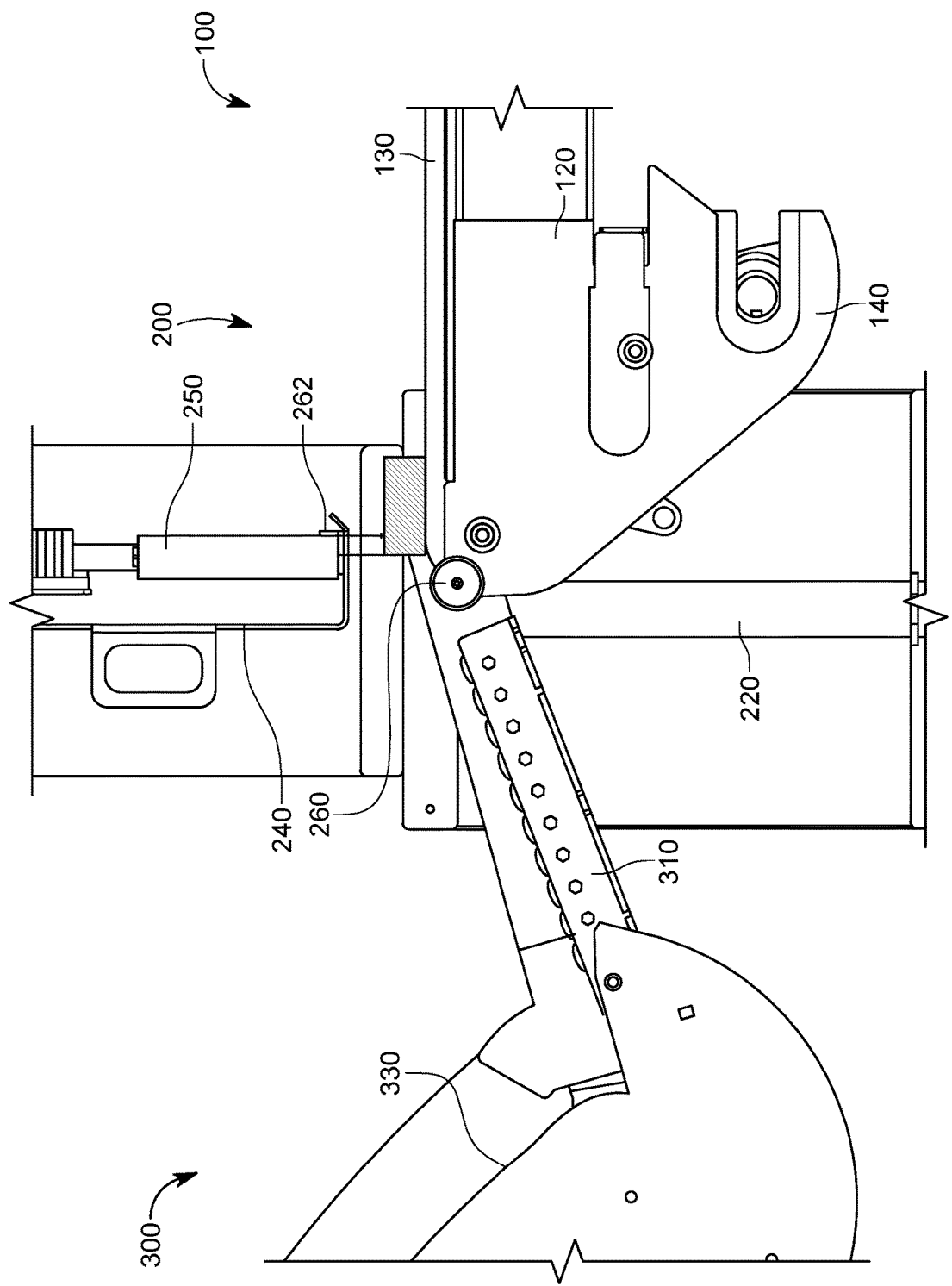
Figure 3C:
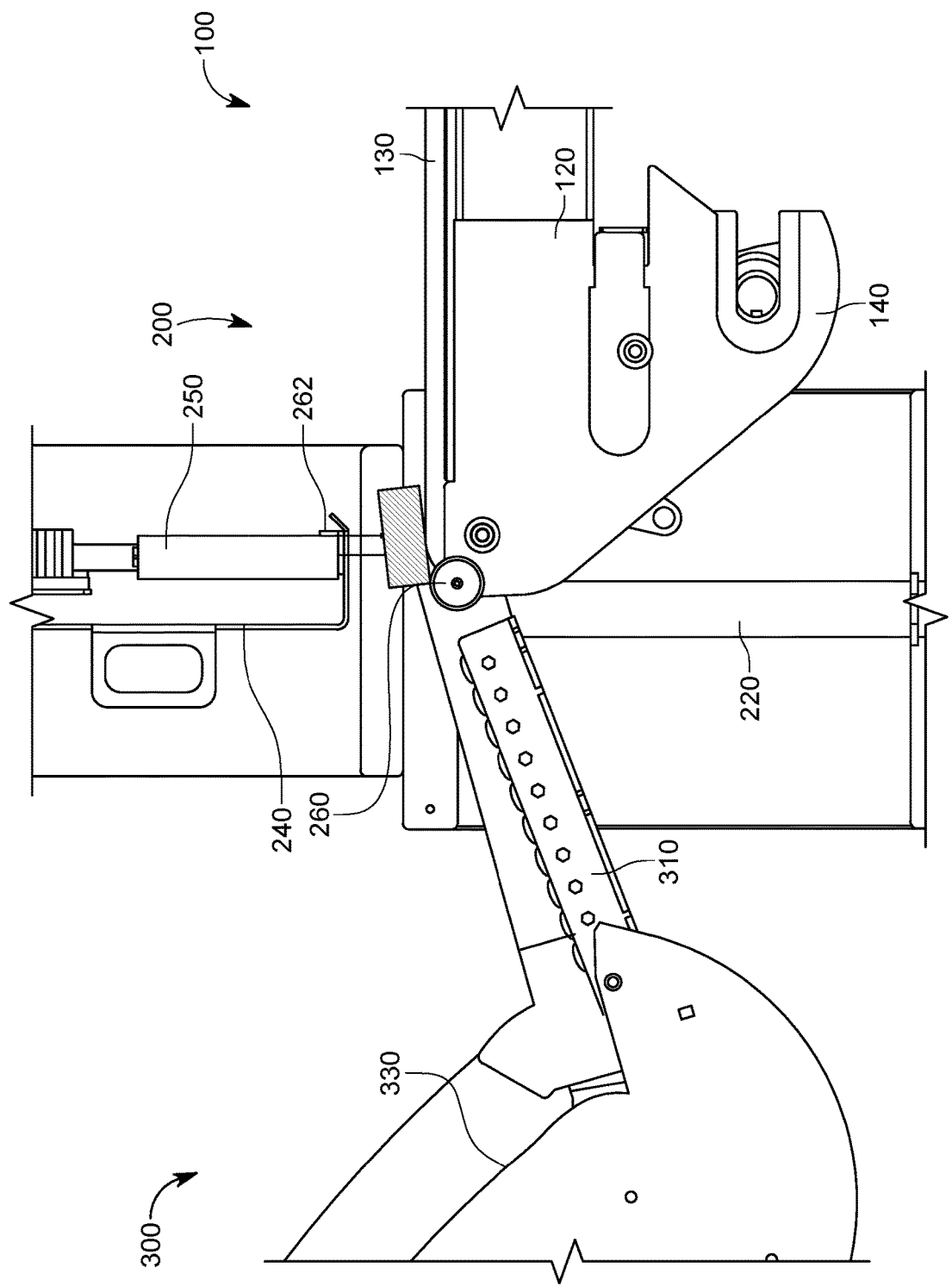
Figure 3D:
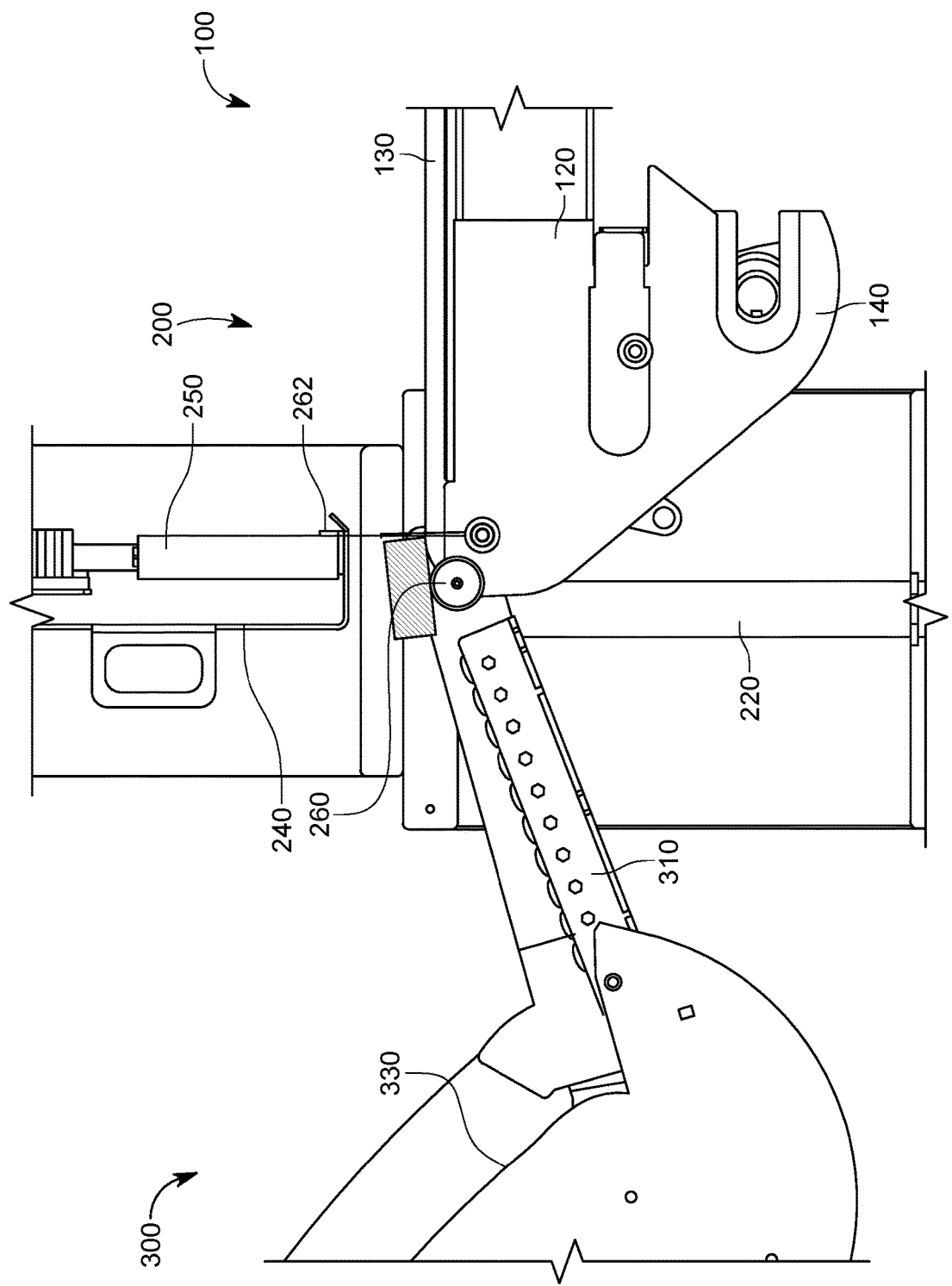
Figure 3E:
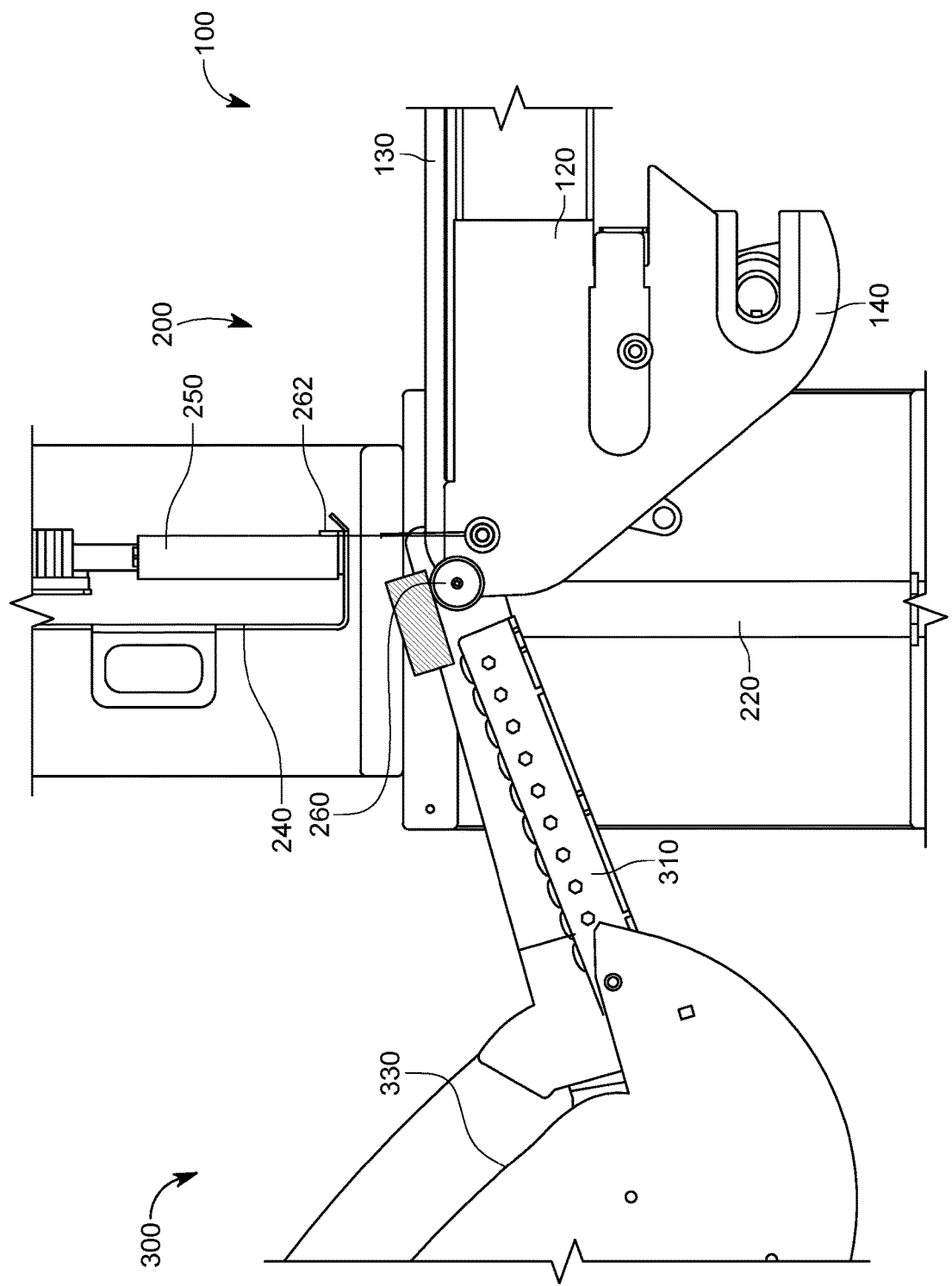
Figure 4A:
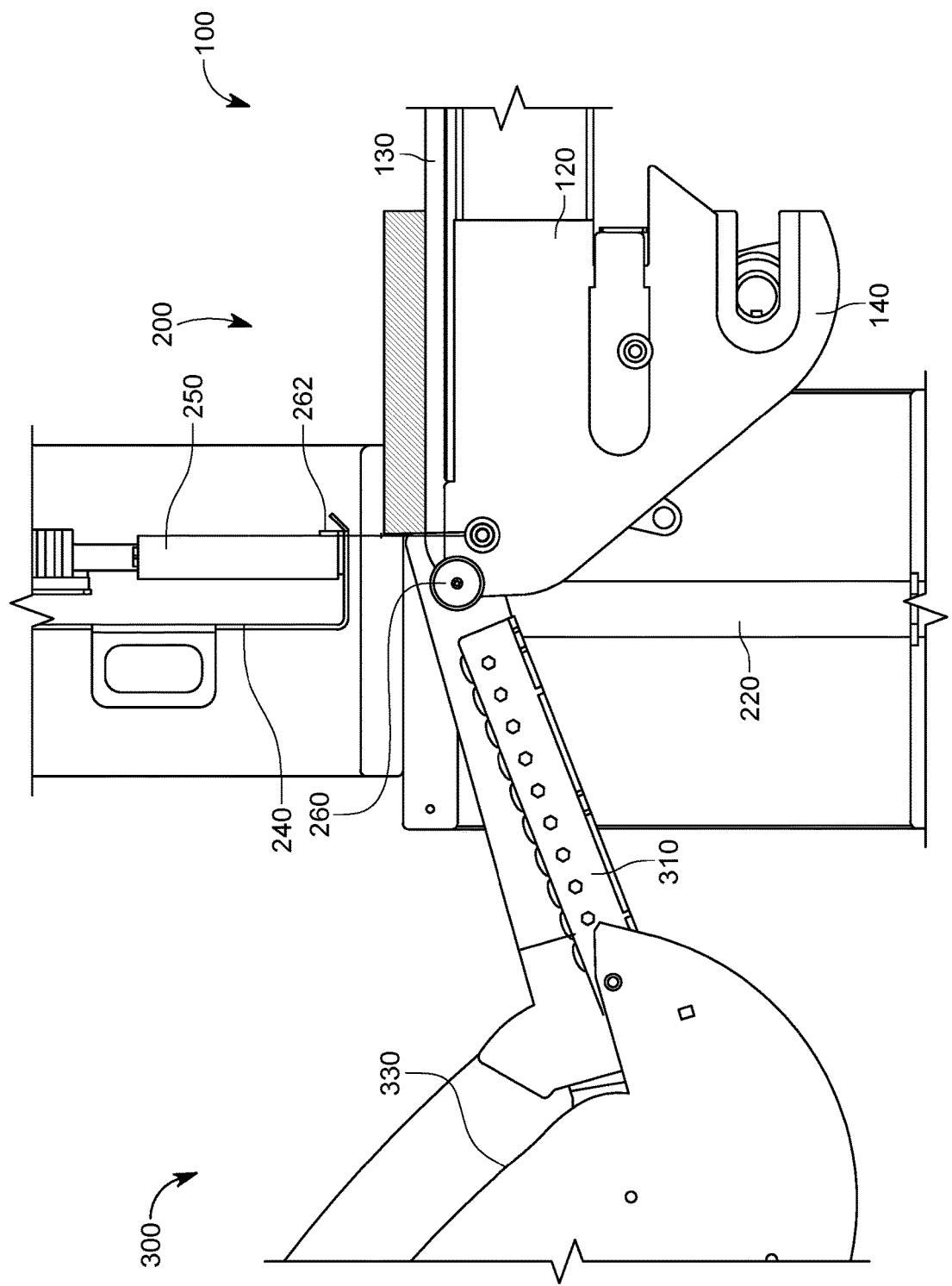
Figure 4B:
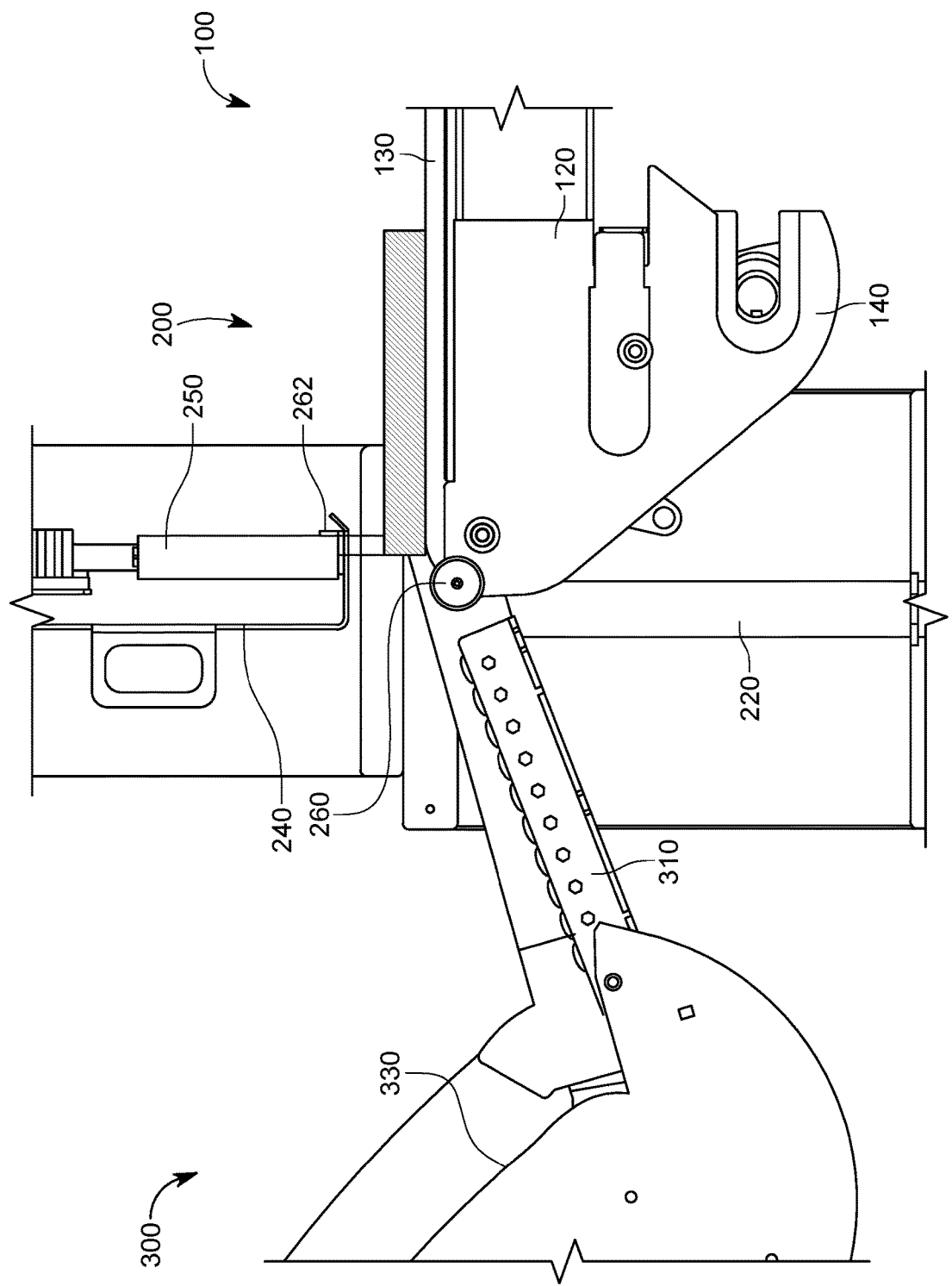
Figure 4C:
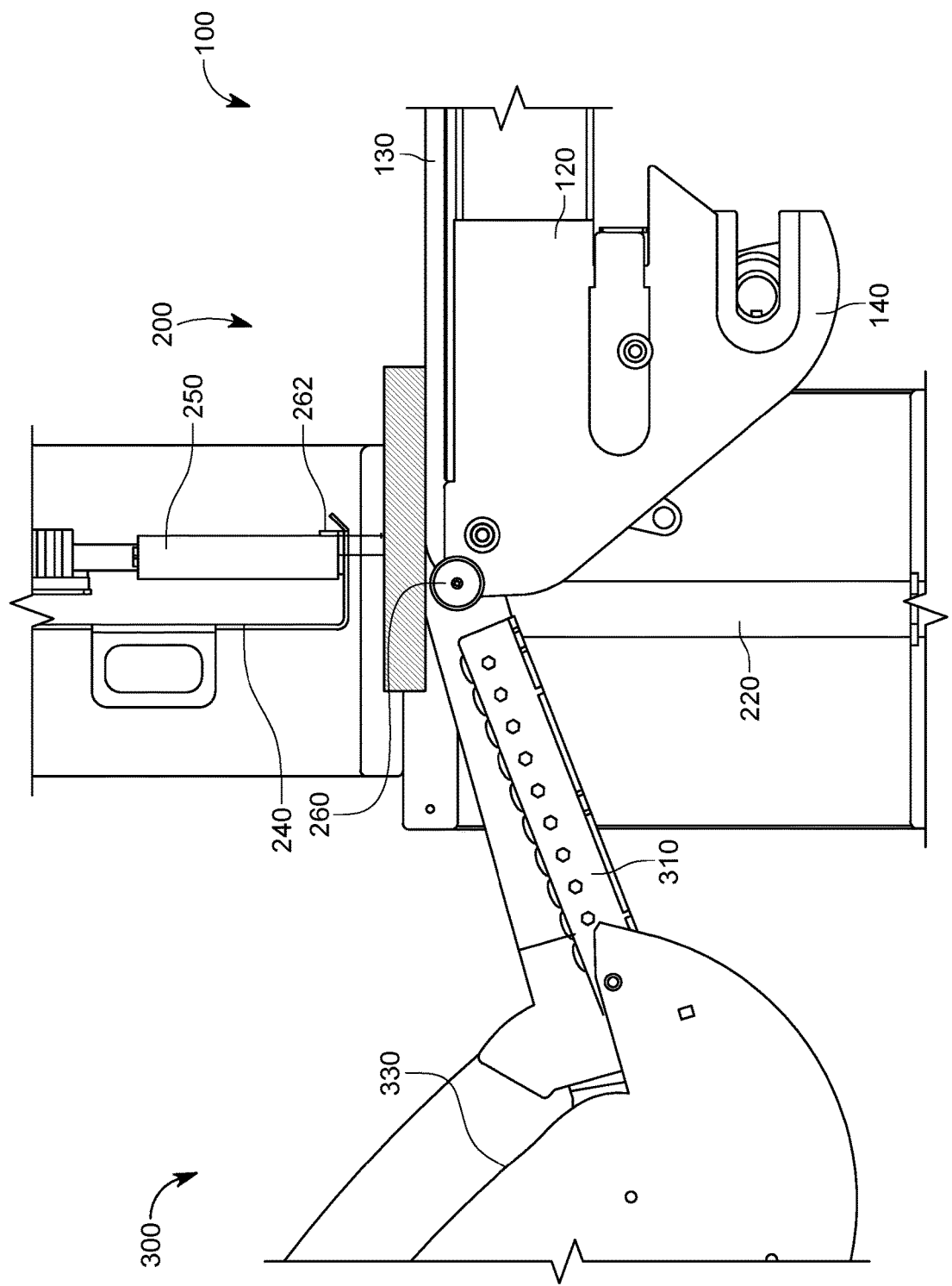
Figure 4E:
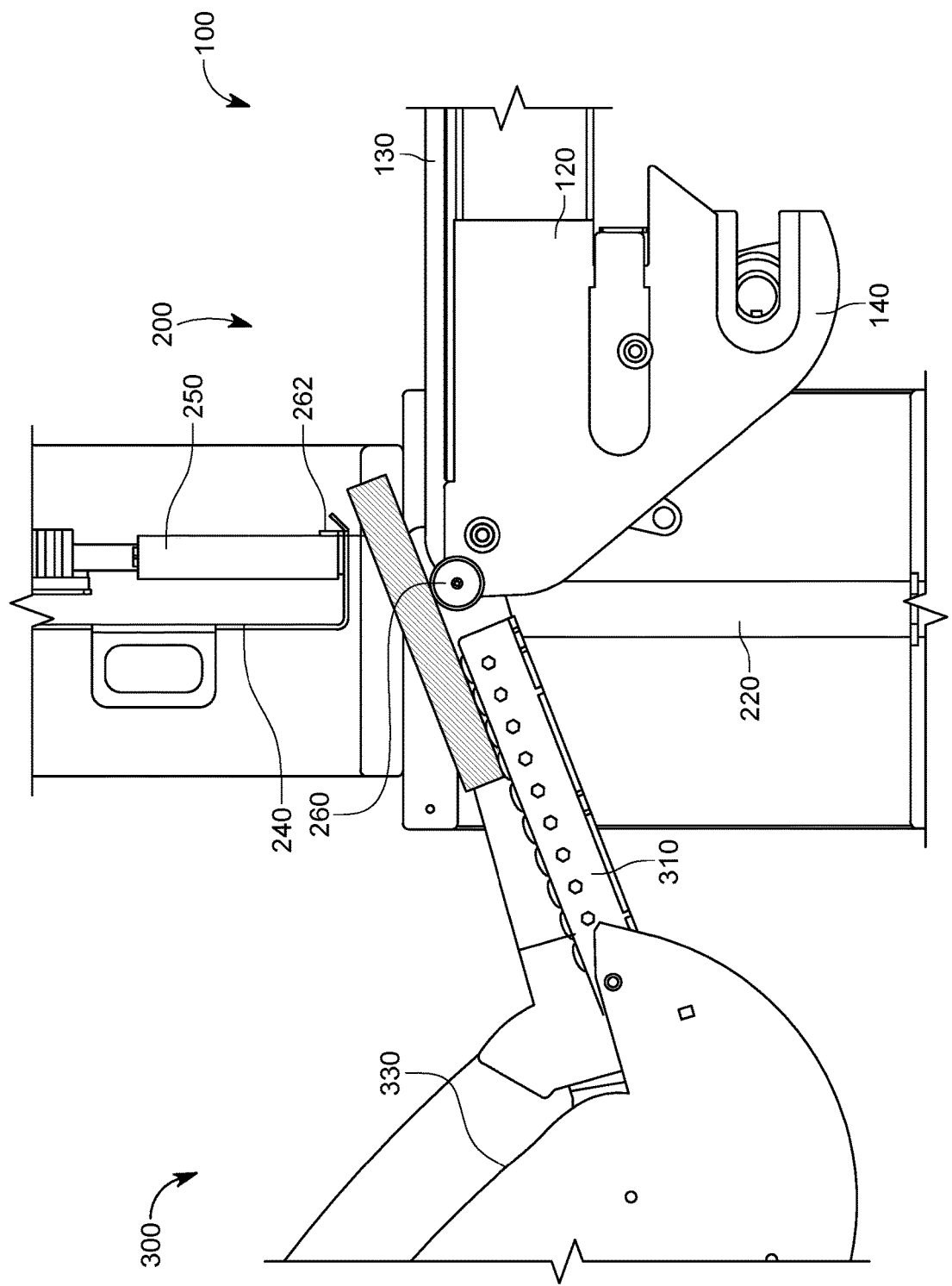

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1A to 14E illustrate one example embodiment of a lumber handling and cutting apparatus of the present disclosure generally indicated by numeral 50 (and sometimes referred to herein as the "apparatus" for brevity). FIGS. 1A to 14E show selected components of the apparatus 50 during the handling and cutting of different example lumber boards that may be used to manufacture trusses, joists, other such lumber supported structures, or otherwise. Various other components of the apparatus 50 not discussed herein will be readily understood by those skilled in the art.

As best shown in FIGS. 1A to 14E, the illustrated example apparatus 50 includes various stations including: (1) an incoming material conveyor assembly 100; (2) a printer assembly 200 adjacently positioned and/or connected to the incoming material conveyor assembly 100; (3) a material infeed assembly 300 adjacently positioned and/or connected to the incoming material conveyor assembly 100; (4) a cutting assembly 400 adjacently positioned and/or connected to the infeed assembly 300; (5) a material outfeed assembly 500 adjacently positioned and/or connected to the cutting assembly 400; and (6) an outgoing material conveyor assembly 600 adjacently positioned and/or connected to the material outfeed assembly 500.

The incoming material conveyor assembly 100 of the apparatus 50 is configured to receive material such as lumber for processing by the apparatus 50. More specifically, as best shown in FIGS. 1A to 1D, 2, and 3A to 4E, the incoming material conveyor assembly 100 includes: (1) a support frame 110; (2) a plurality of feed members 120 supported by and suitably connected to the support frame 110; (3) a conveyor member 130 suitably connected to each of the feed members 120; and (4) a conveyor drive assembly 140 supported by the support frame 110 and/or the plurality of feed members 120. The conveyor drive assembly 140 is suitably connected to and engaged with the conveyor member 130 connected to each of the feed members 120. The conveyor drive assembly 140 and the conveyor member 130 are configured to support and move lumber boards (of different dimensions) on each of the feed members 120 as the lumber boards move toward and to the printer assembly 200 and toward and to the material infeed assembly 300. The incoming material conveyor assembly 100 thus provides a suitable support structure for receiving and conveying material such as lumber boards (of different dimensions) to be processed by the apparatus 50. It should be appreciated that the incoming material conveyor assembly 100 may be otherwise suitably configured in accordance with the present disclosure.

The printer assembly 200 of the apparatus 50 enables the apparatus 50 to print on or otherwise mark each of the lumber boards before processing the lumber boards by the cutting assembly 400. More specifically, as best shown in FIGS. 1A to 1D, 2, and 3A to 4E, the printer assembly 200 includes: (1) a printer support base 210; (2) a 220 printer support frame supported by and suitably connected to the printer support base 210; (3) a printer support arm 230 supported by and suitably connected to the printer support frame 220; (4) a print head mounting bracket 240 connected to the printer support arm 230; (5) a print head 250 supported by and suitably connected to the print head mounting bracket 240; and (6) a multi-size board alignment assembly 260 positioned at an end of at least one of the feed members 120 of the incoming material conveyor assembly 100. The print head 250 is positioned in a downward facing manner to print on each of the lumber boards (of different dimensions) as each of the lumber boards passes underneath the print head 250 at a transition point as further described below.

The printer assembly 200 enables printing on a designated surface (i.e., a top, bottom, or side surface) of each of the lumber boards (of different dimensions) as each of the lumber boards are fed from the incoming material conveyor assembly 100 to the material infeed assembly 300. It should be understood that lumber may sometimes be used herein to refer to one or more lumber boards (which also includes any suitable pieces of lumber that is or can be processed by the apparatus 50). In this illustrated example embodiment, the printer assembly 200 is positioned at a transition point between the incoming material conveyor assembly 100 and the infeed conveyor 310 of the material infeed assembly 300.

The printer support frame 220 positions (or enables positioning) of the printer support arm 230 over the top of or above the incoming lumber board at the transition point. Accordingly, the print head mounting bracket 240 is attached to the printer support arm 230 such that the print head 250 is positioned above each incoming lumber board at the transition point. In the illustrated example embodiment, the print head 250 faces downward and prints on the designated surface of each lumber board as that lumber board passes underneath the print head 250. The printer assembly 200 further includes at least one multi-size board alignment assembly 260 connected to the feed members 120 of the incoming material conveyor assembly 100. In the illustrated example, the multi-size board alignment assembly 260 is located at the transition point between the feed members 120 and the infeed conveyor 310. The multi-size board alignment assembly 260 enables the apparatus 50 to square or otherwise align each incoming lumber board with respect to the print head 250 for a suitable period of time as that lumber board passes underneath the print head 250.

In the illustrated example, the multi-size board alignment assembly 260 enables the printer assembly 200 to print on each incoming lumber board having one of a variety of different orientations, shapes, dimensions and/or sizes without adjusting and/or reconfiguring the printer assembly 200 and/or the apparatus 50.

For example, as best seen in FIGS. 3A to 3E, the printer assembly 200 is configured to print on a lumber board (not labeled) having a first set of dimensions and/or orientation (e.g., 4×2 or 3×2) as that lumber board passes underneath the print head 250. The incoming material conveyor assembly 100 delivers that lumber board up to a manual stop (not shown) that squares the lumber board prior to passing underneath the print head 250 for a suitable period of time. Once that lumber board is squared or otherwise aligned, the material conveyor assembly 100 may back that lumber board up a small amount such that the manual stop can be lowered. The incoming material conveyor assembly 100 feeds that lumber board forward at a set speed. As the lumber board feeds forward, a print sensor 262 detects the presence of that lumber board and activates the print head 250. The print head 250 prints on the designated surface of that lumber board as that lumber board is fed from the incoming material conveyor assembly 100 to the material infeed assembly 200. While moving forward underneath the print head 250, that lumber board contacts the multi-size board alignment assembly 260 that re-squares or otherwise maintains alignment of that lumber board as that lumber board passes underneath the print head 250. That is, the multi-size board alignment assembly 260 helps to maintain the print position (e.g., flat or horizontal) of that lumber board with respect to the print head 250 as that lumber board passes underneath the print head 250. At the point that the lumber board is over half way underneath the print head 250, the lumber board center of gravity will pass over the center of the multi-size board alignment assembly 260 causing that lumber board to feed downwardly into the infeed conveyor 310 of the material infeed assembly 300. The next lumber board can then subsequently transition under the print head 250 for printing. This printing process will continue until the last lumber board for the particular job is completed.

As best seen in FIGS. 4A to 4E, the printer assembly 200 prints on a lumber board (not labeled) having a second different set of dimensions and/or orientation (e.g., 2×12) as that lumber board passes underneath the print head 250. The incoming material conveyor assembly 100 delivers that lumber board up to a manual stop (not shown) that squares the lumber board prior to passing underneath the print head 250 for a suitable period of time. Once that lumber board is squared or otherwise aligned, the material conveyor assembly 100 may back that lumber board up a small amount such that the manual stop can be lowered. The incoming material conveyor assembly 100 feeds that lumber board forward at a set speed. As that lumber board feeds forward, a print sensor 262 detects the presence of that lumber board and activates the print head 250. The print head 250 prints on the designated surface of that lumber board as that lumber board is fed from the incoming material conveyor assembly 100 to the material infeed assembly 200. While moving forward underneath the print head 250, that lumber board contacts the multi-size board alignment assembly 260 that re-squares or otherwise maintains alignment of that lumber board as that lumber board passes underneath the print head 250. That is, the multi-size board alignment assembly 260 helps to maintain the print position (e.g., flat or horizontal) of that lumber board with respect to the print head 250 as that lumber board passes underneath the print head 250. At the point that the lumber board is over half way underneath the print head 250, the lumber board center of gravity will pass over the center of the multi-size board alignment assembly 260 causing the lumber board to feed downwardly into the infeed conveyor 310 of the material infeed assembly 300. The next lumber board can then transition under the print head 250 for printing. The process of printing will continue until the last lumber board for the particular job is completed.

In various embodiments of the present disclosure, the printer support arm 230 that extends over the lumber board and the print head mounting bracket 240 is slidable along the printer support arm 230 such that the print head 250 prints at a desired location along the designated surface of each lumber board. Furthermore, the printer support arm 230 may be configured to rotate back from the position over the lumber board to enable cleaning or other maintenance of the print head 250.

In various embodiments of the present disclosure, the multi-size board alignment assembly 260 includes one or more idler rollers that is/are each positioned at an end of one or more respective feed members 120 of the incoming material conveyor assembly 100. In certain embodiments of the present disclosure, the multi-size board alignment assembly 260 includes one or more idler rollers that is/are otherwise suitably connected to or otherwise attached to one or more feed members 120 of the incoming material conveyor assembly 100. The multi-size board alignment assembly 260 enables the lumber board to smoothly transition from the incoming material conveyor assembly 100 to the infeed assembly 300. The multi-size board alignment assembly 260 further enables the printer assembly 200 to square (or re-square) each lumber board as that lumber board passes underneath the print head 250 for printing. Thus, the multi-size board alignment assembly 260 enables the printer assembly 200 to print on the designated surface of lumber having a variety of different dimensions and/or orientations (such as but not limited to 3×2, 4×2, and/or 2×12 lumber boards) without adjusting or reconfiguring the setup of the apparatus 50.

It should thus be appreciated that in various embodiments of the present disclosure, the multi-board alignment assembly 260 is positioned at an end of one or more feed members 120 of the incoming material conveyor assembly 100.

In various embodiments of the present disclosure, the multi-size board alignment assembly 260 is suitably connected or otherwise attached to one or more feed members 120 of the incoming material conveyor assembly 100.

In various alternative embodiments of the present disclosure, the multi-size board alignment assembly 260 may be alternatively attached to the infeed conveyor 310 of the material infeed assembly 300.

In various alternative embodiments of the present disclosure, the multi-size board alignment assembly 260 can be configured to include one or more independently driven rollers that feed(s), square(s) and align(s) each lumber board as that lumber board is printed on by the printer assembly 200.

In various alternative embodiments of the present disclosure, the printer assembly 200 may be configured such that the print head 250 is positioned below the lumber board. As such, the print head 250 prints on or otherwise marks each lumber board as that lumber board passes over the print head 250.

Referring now to FIGS. 5A to 12D, the material infeed assembly 300 of the apparatus 50 is configured to receive each lumber board after that lumber board is printed on by the printer assembly 200. More specifically, the material infeed assembly 300 is configured to align, orient (or re-orient), and support each lumber board before that lumber board is fed into the cutting assembly 400. In the illustrated example, the material infeed assembly 300 includes: (1) an infeed conveyor 310 adjacently positioned and/or connected to at least one of the feed members 120 of the incoming material conveyor assembly 100; (2) a stop member 320 connected to the infeed conveyor 310; (3) a drag chain or a dogged chain conveyor 330 adjacent to the end of the infeed conveyor 310 and the stop member 320; (4) an actuator mounting bracket 340 suitably connected to the infeed conveyor 310; (5) an actuator or actuator member 350 supported by and suitably connected to the actuator mounting bracket 340; (6) a lifting member 360 suitably connected to the actuator member 350; (7) a guide member 370 suitably connected to the infeed conveyor 310; (8) an inner support member 380 suitably connected to the stop member 320 and the infeed conveyor 310; and (9) an outer support member 390 suitably connected to the infeed conveyor 310.

As best illustrated in FIGS. 5A to 5E, 6A to 6E, and 7A to 7D, the infeed assembly 300 includes the lifting member 360 configured to engage with and change (if needed) the orientation (or re-orientation) of each lumber board before that lumber board is fed into the cutting assembly 400. The lifting member 360 includes: (1) a lifting member arm 362; (2) a lifting member hand portion 364 defined at an end of the lifting member arm 362; and (3) a lifting member finger 366 connected to the lifting member hand portion 364. The lifting member 360 also includes (4) a lifting member notch 368 defined in or by the lifting member hand portion 364 and/or the lifting member finger 366.

Figure 5A:
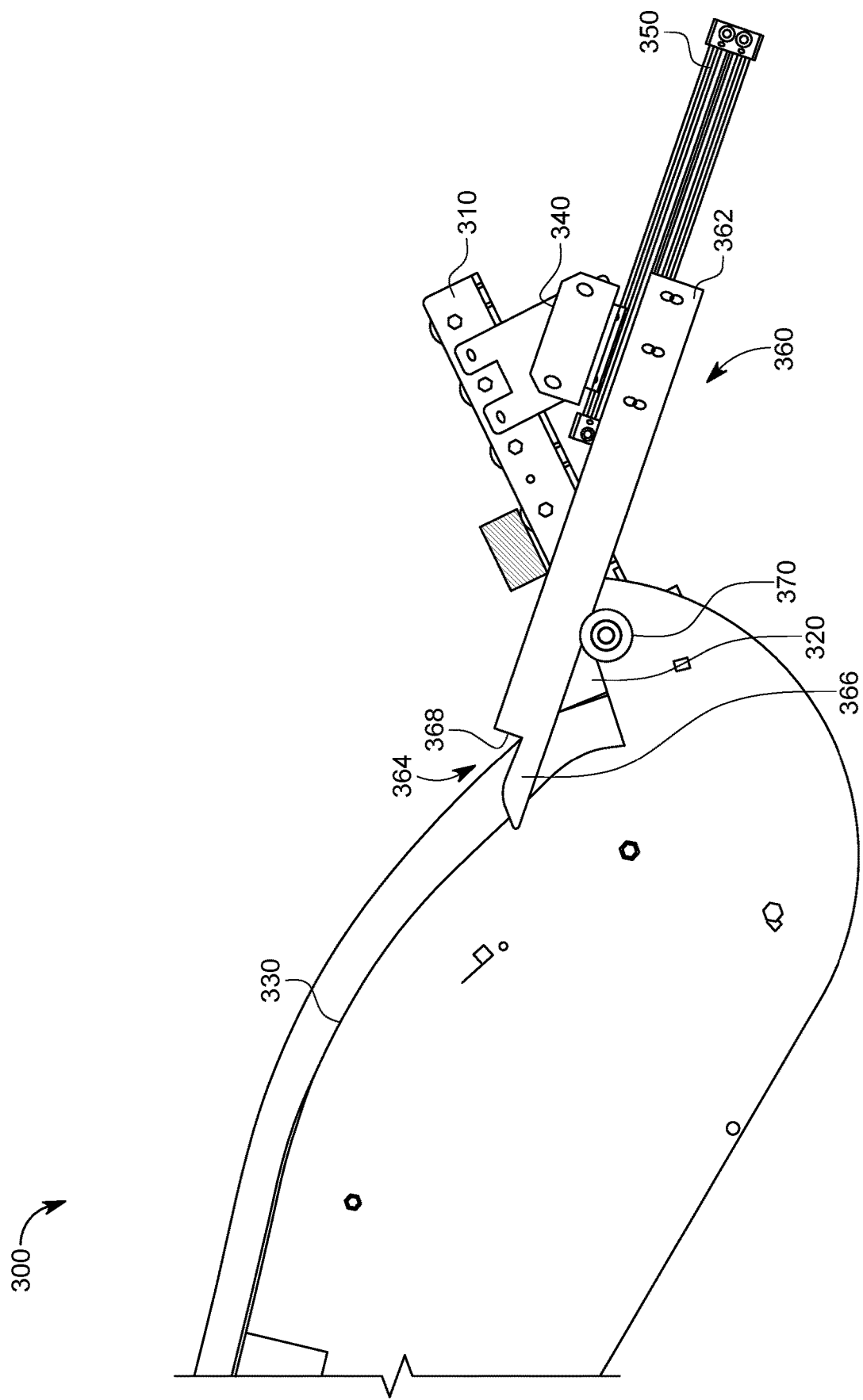
FIGS. 5A to 5E are enlarged fragmentary side views of the material infeed assembly of the lumber handing and cutting apparatus of FIG. 1A, showing the 3×2 size lumber board progression through the material infeed assembly, and showing lumber board reorientation by the lifting arm member as the lumber board transitions from the infeed conveyor to the drag or dogged chain conveyor.
Figure 5B:
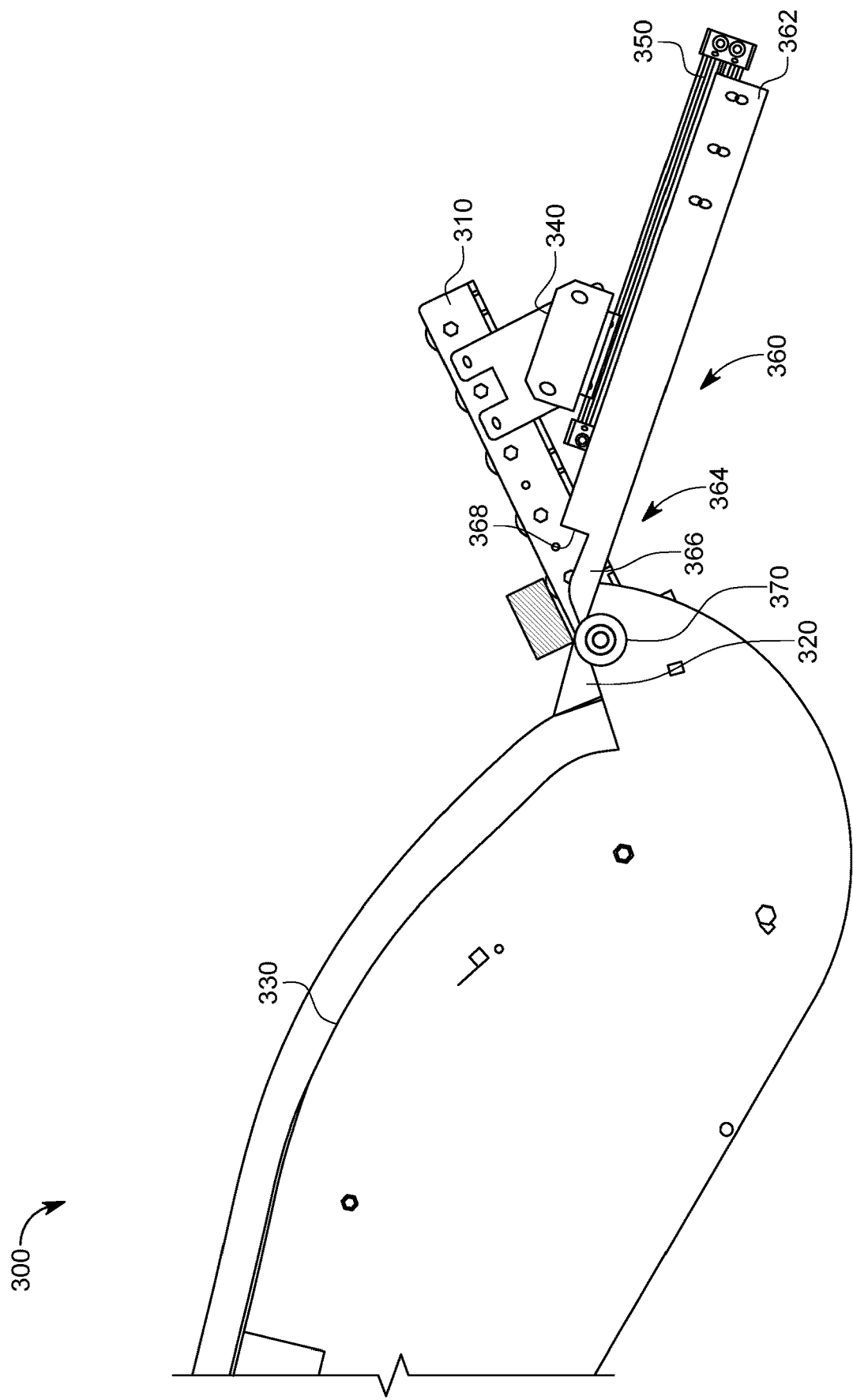
Figure 5C:
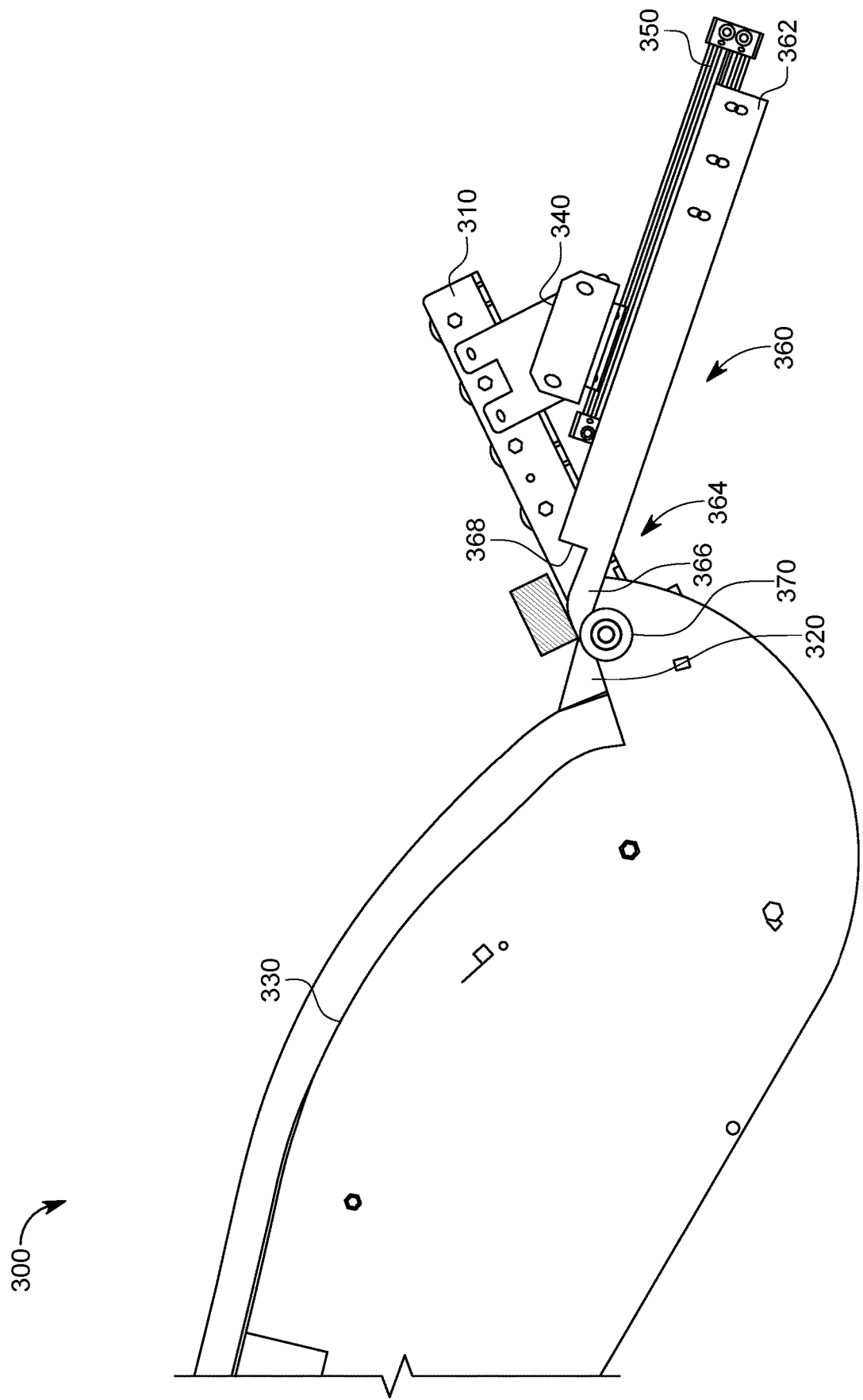
Figure 5D:
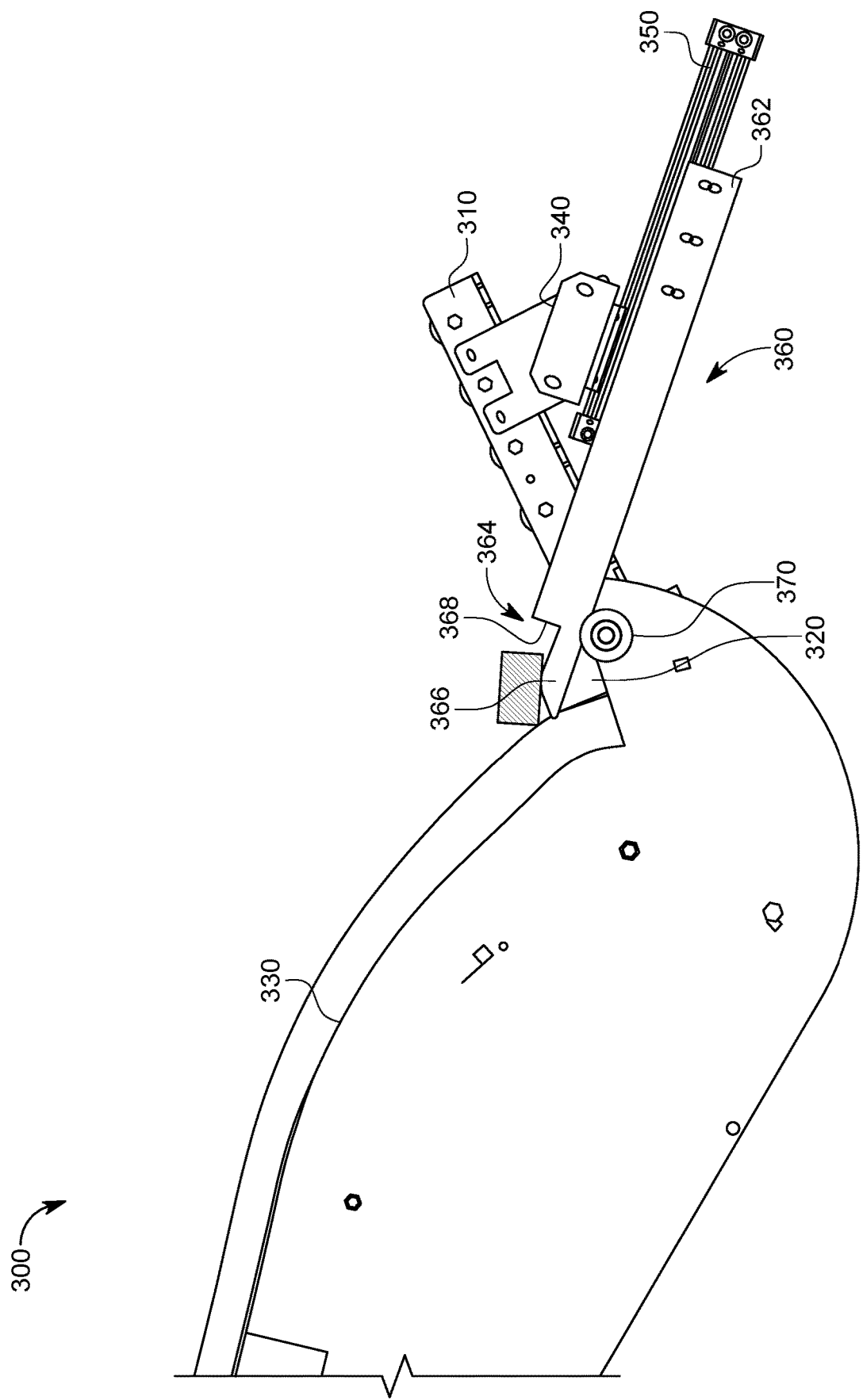
Figure 5E:
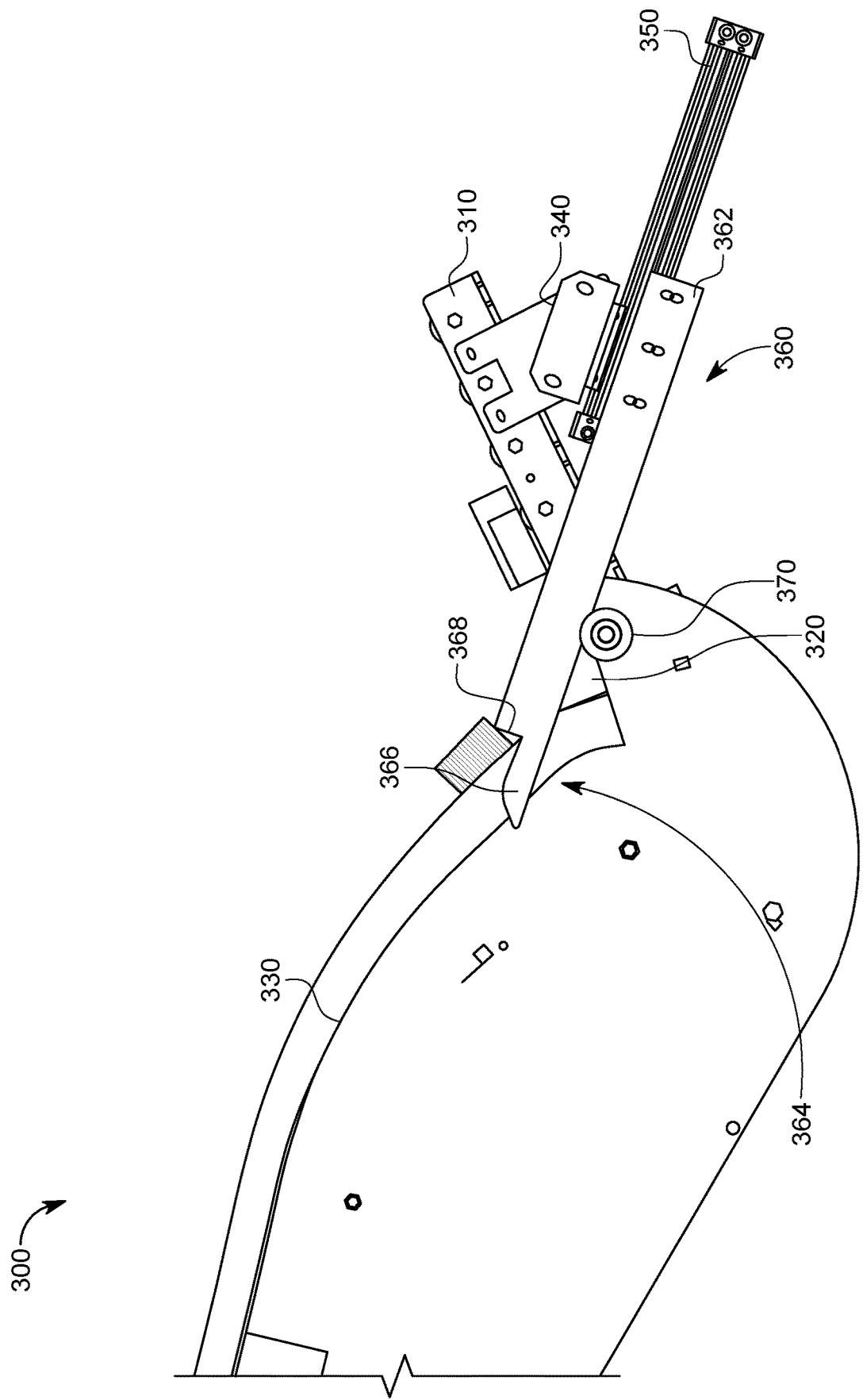

FIGS. 5A to 5E illustrate one example progression through the material infeed assembly 300 of a first example lumber board (not labeled) having a first size and orientation (such as 3×2, 2×3, or other suitable size and orientation). As the lumber board is fed from the incoming material conveyor assembly 100, the apparatus 50 causes the lifting member 360 to be in an extended position. In this illustrated example embodiment, the lifting member 360 is partially supported by a guide member 370. The guide member 370 may be a roller or other suitable member that contacts or is contacted by the lifting member 360 as the actuating member 350 extends and retracts the lifting member 360 (forwardly and rearwardly, respectively). With the lifting member 360 in the extended position, the infeed assembly 300 receives a lumber board on the infeed conveyor 310. In this illustrated example embodiment, the infeed conveyor 310 is sloped such that the lumber board slides down the infeed conveyor 310 and contacts the lifting member 360 in the horizontal orientation, as shown in FIG. 5A. The actuating member 350 then retracts the lifting member 360 which in turn causes the lumber board to engage with the stop member 320, as shown in FIG. 5B. The actuating member 350 then extends the lifting member 360 such that the lifting member finger 366 engages a surface and/or an edge (e.g., bottom surface, and/or front edge) of the lumber board, as shown in FIG. 5C. The engagement between the lifting member finger 366 and the movement of the lifting member 360 and the lumber board causes the lumber board to rotate and/or slide into the lifting member notch 368 of the lifting member hand portion 364, as shown in FIGS. 5C and 5D. The actuating member 350 continues to extend the lifting member 360 such that the plurality of dogs of the dogged chain conveyor 330 grab the 3×2 lumber board in the desired orientation, as shown in FIG. 5E. Accordingly, the dogged chain conveyor 330 receives the 3×2 lumber board and feeds that lumber board into the cutting assembly 400 of the apparatus 50. This enables the next lumber board to drop down the infeed conveyor 310 and the progression repeats itself until all of the lumber boards are processed.

Figure 6A:
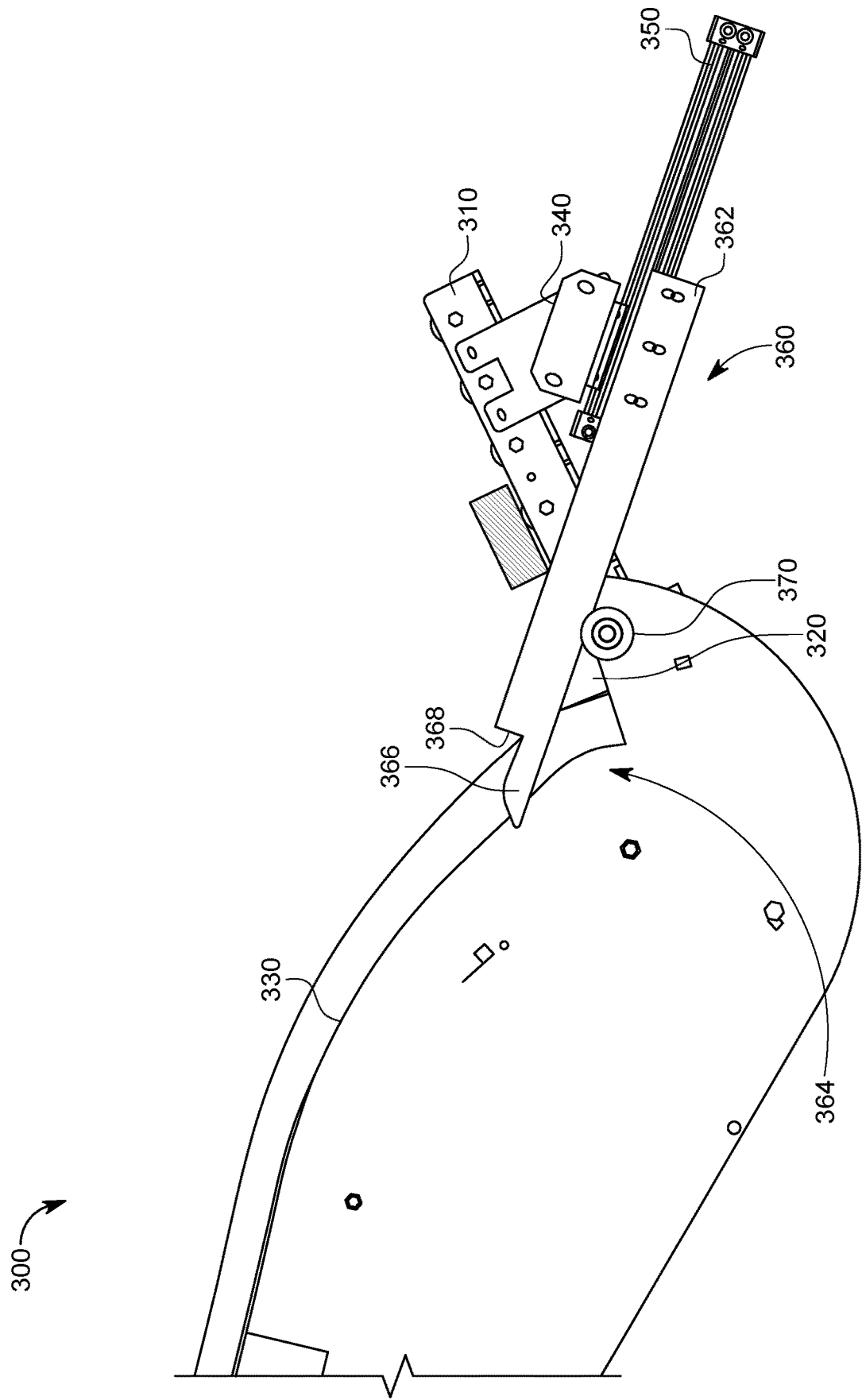
FIGS. 6A to 6E are enlarged fragmentary side views of the material infeed assembly of the lumber handing and cutting apparatus of FIG. 1A, showing the 4×2 size lumber board progression through the material infeed assembly, and showing lumber board reorientation by the lifting arm member as the lumber board transitions from the infeed conveyor to the drag or dogged chain conveyor.
Figure 6B:
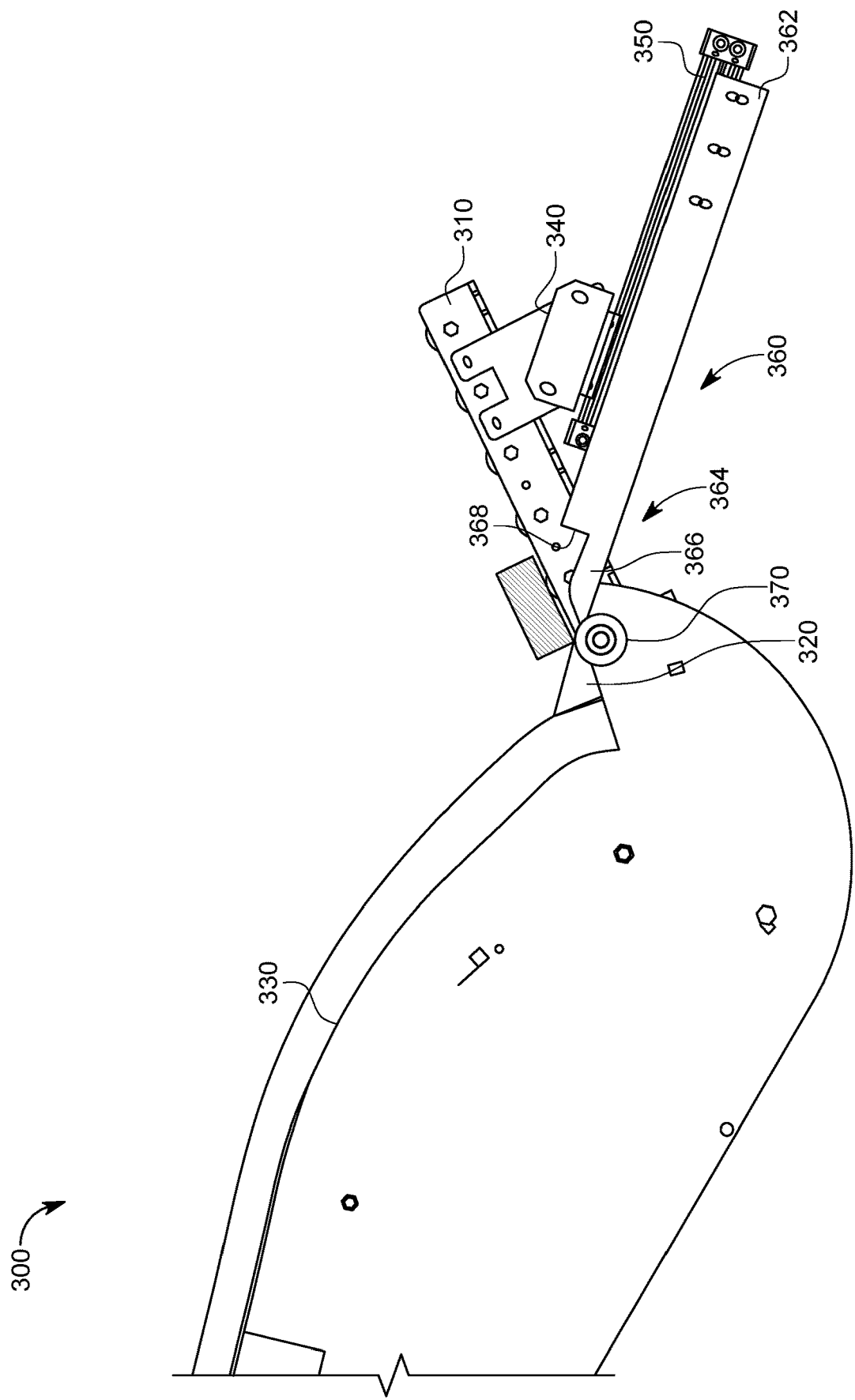
Figure 6C:
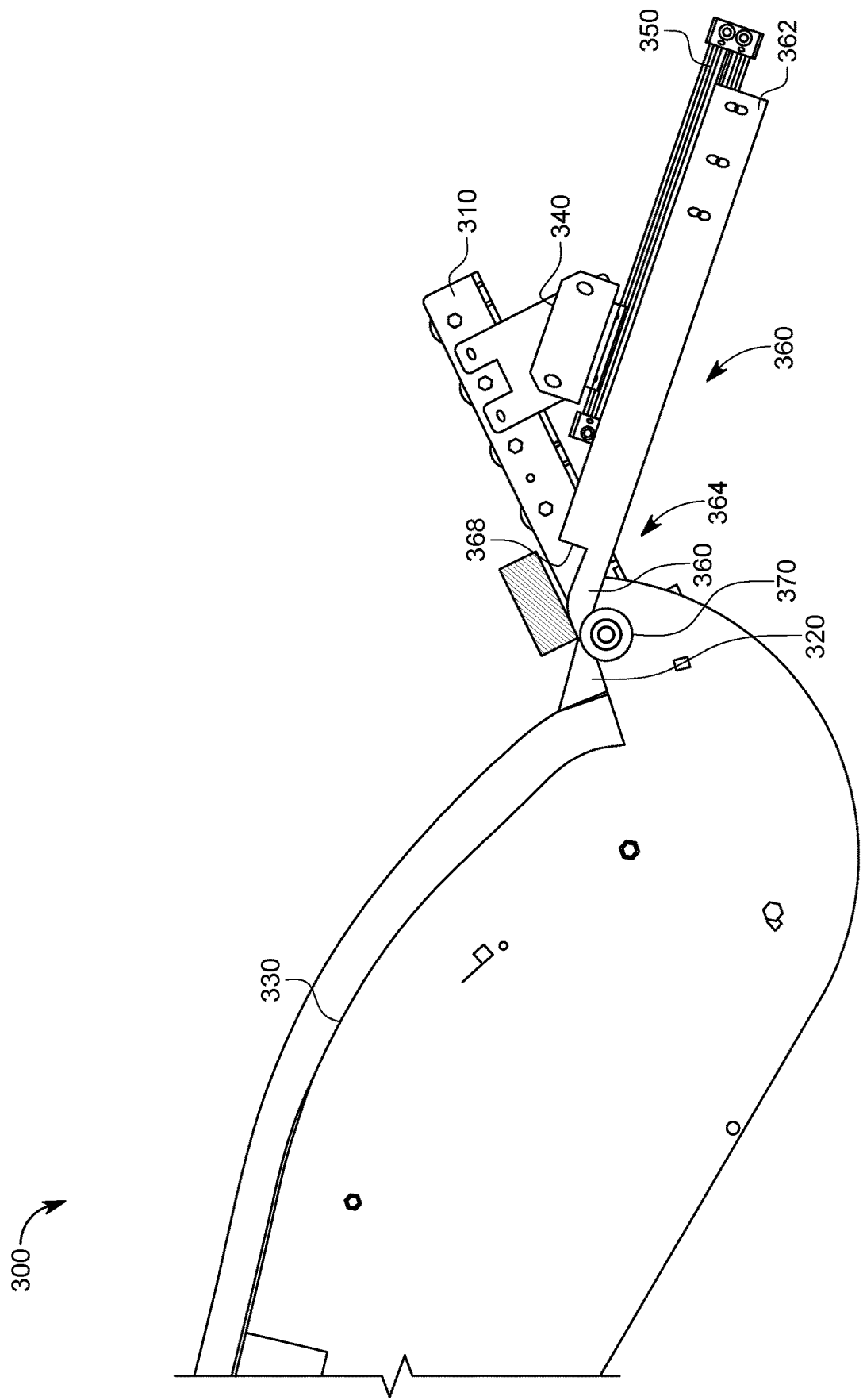
Figure 6D:
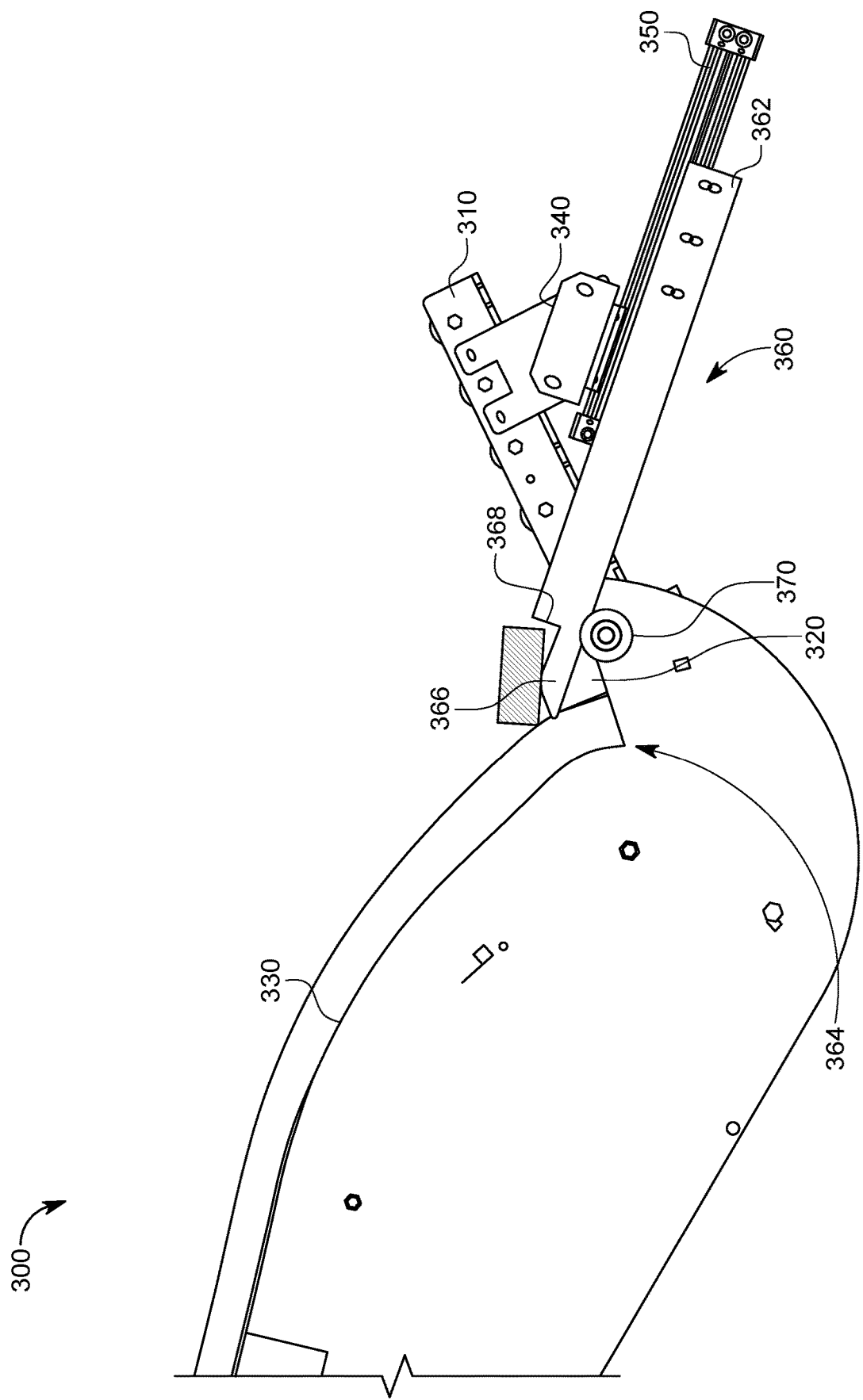
Figure 6E:
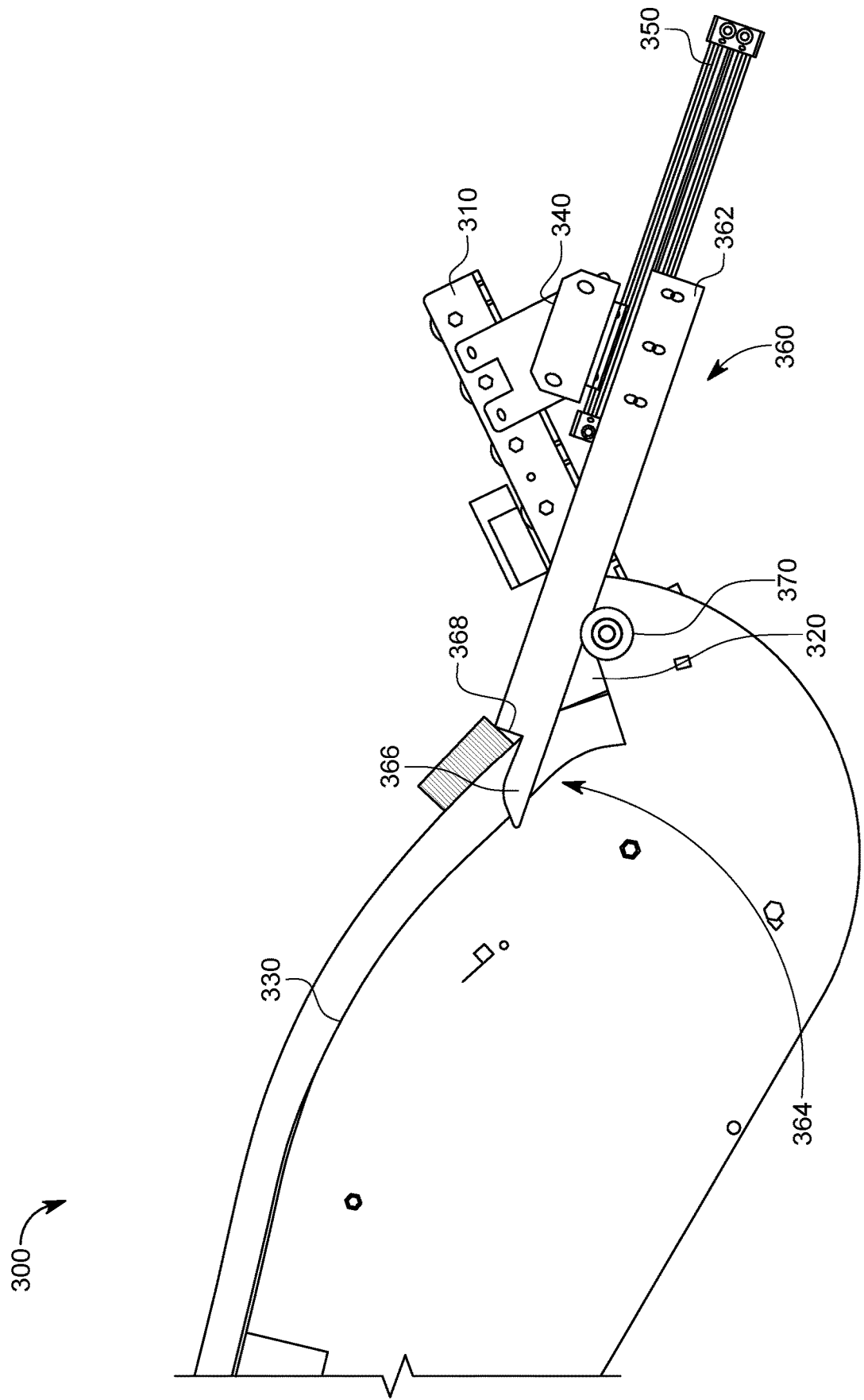

FIGS. 6A to 6E illustrate another example progression through the material infeed assembly 300 of a second example lumber board (not labeled) having a different second size and orientation (such as 4×2, 2×4, or other suitable size and orientation). As the lumber board is fed from the incoming material conveyor assembly 100, the lifting member 360 is in an extended position, as shown in FIG. 6A. In this illustrated example, the lifting member 360 is partially supported by the guide member 370. The guide member 370 may be a roller or other suitable member that contacts or is contacted by the lifting member 360 as the actuating member 350 extends and retracts the lifting member 360. With the lifting member 360 in the extended position, the infeed assembly 300 receives a lumber board on the infeed conveyor 310. The infeed conveyor 310 may be sloped such that the lumber board slides down the infeed conveyor 310 and contacts the lifting member 360 in the horizontal orientation. The actuating member 350 then retracts the lifting member 360 and the lumber board engages with the stop member 320, as shown in FIG. 6B. The actuating member 350 then extends the lifting member 360 such that the lifting member finger 366 engages a surface and/or an edge (e.g., bottom surface, and/or front edge) of the lumber board, as shown in FIG. 6C. The engagement between the lifting member finger 366 and the lumber board and the movement of the lifting member 360 causes the lumber board to rotate and/or slide into the lifting member notch 368 of the lifting member hand portion 364, as shown in FIGS. 6C and 6D. The actuating member 350 continues to extend the lifting member 360 such that the plurality of dogs of the dogged chain conveyor 330 grab the lumber board in the desired orientation, as shown in FIG. 6E. Accordingly, the dogged chain conveyor 330 receives the lumber board and feeds the lumber board into the cutting assembly 400 of the apparatus 50. The next lumber board can then drop down the infeed conveyor 310 and the progression repeats itself until all of the lumber boards are processed.

In various example embodiments, the apparatus 50 may be initially set up for a single lumber board size and/or orientation (e.g., 3×2, 4×2, or other such size and/or orientation). The apparatus 50 is configured to control the actuating member 350 such that the lifting member 360 limits the engagement of the plurality of dogs on the dogged chain conveyor 330 such that the lumber boards (e.g., 3×2 or 4×2 lumber boards) can be fed into the cutting assembly 400. The actuating member 350 and the lifting member 360 are configured such that the material infeed assembly 300 enables the apparatus to feed lumber into the cutting assembly 400 that is 90 degrees to the normal or standard orientation. This enables the apparatus 50 to feed lumber having the same orientation into the cutting assembly 400 for different size lumber boards such as, for example, both 3×2 lumber boards and 4×2 lumber boards.

Figure 7A:
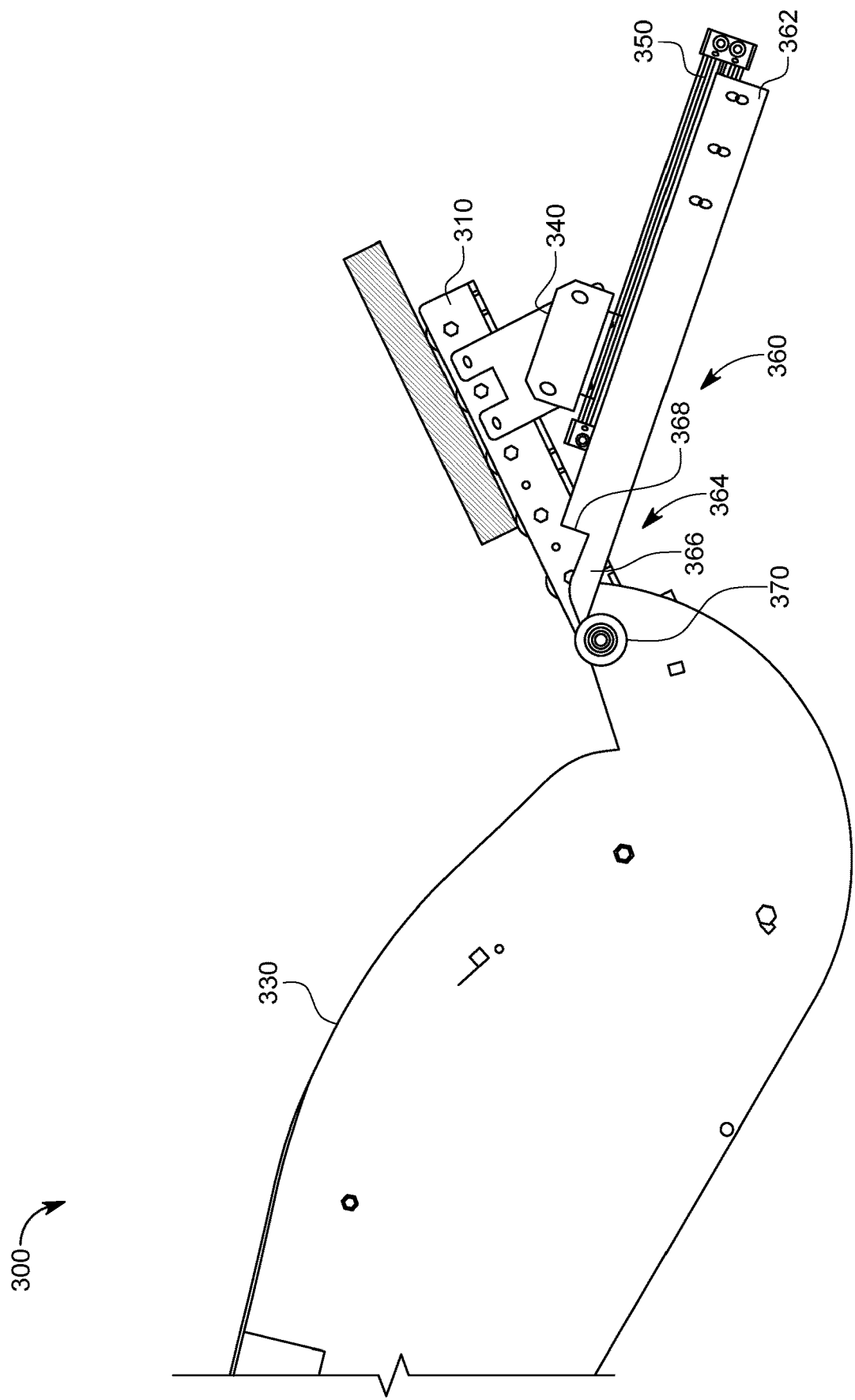
FIGS. 7A to 7C are enlarged fragmentary side views of the material infeed assembly of the lumber handing and cutting apparatus of FIG. 1A, showing the progression through the material infeed assembly of larger dimension lumber board, and showing no lumber board reorientation by the lifting arm member as the larger lumber board transitions from the infeed conveyor to the dogged chain conveyor.
Figure 7B:
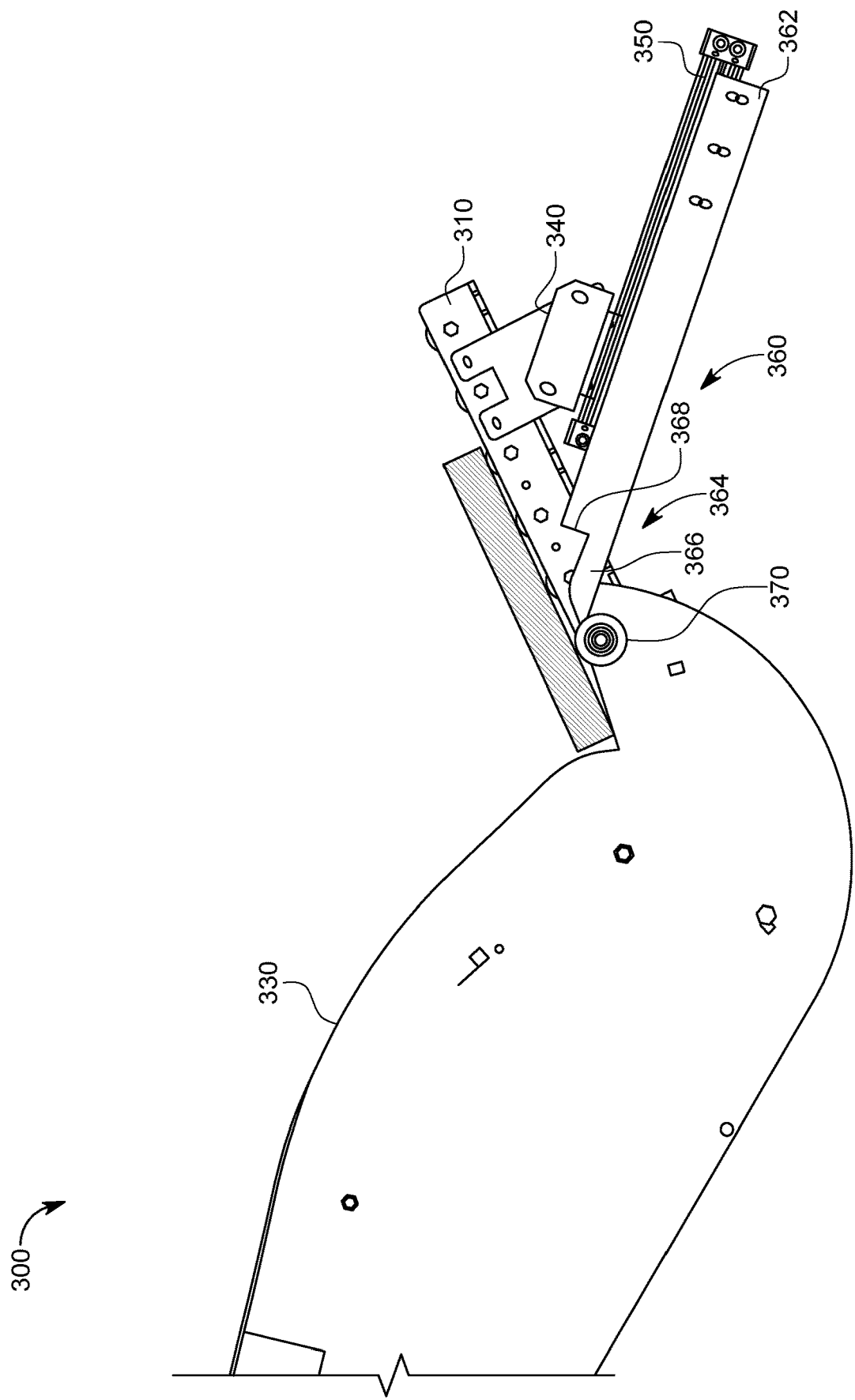
Figure 7C:
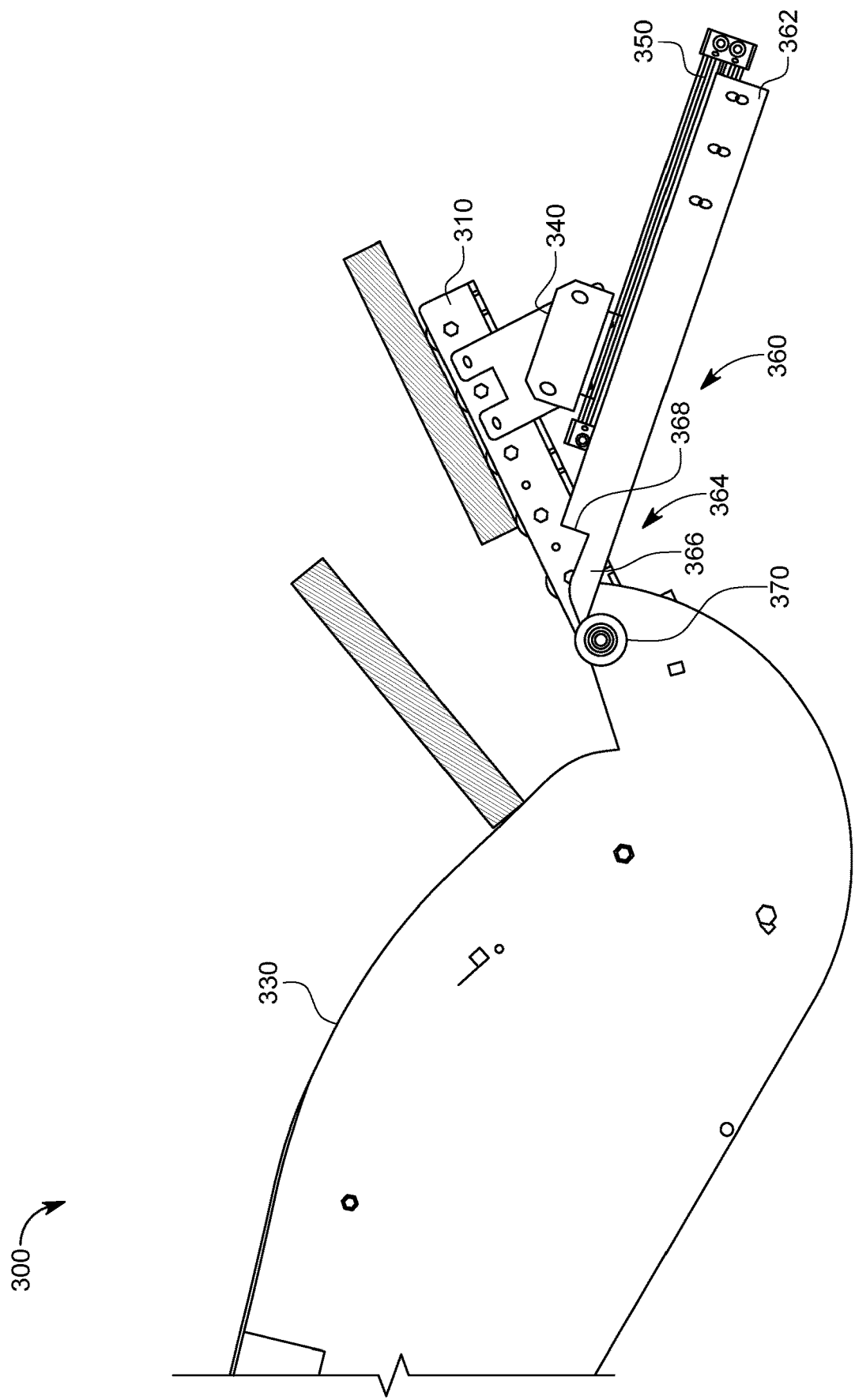
Figure 8:
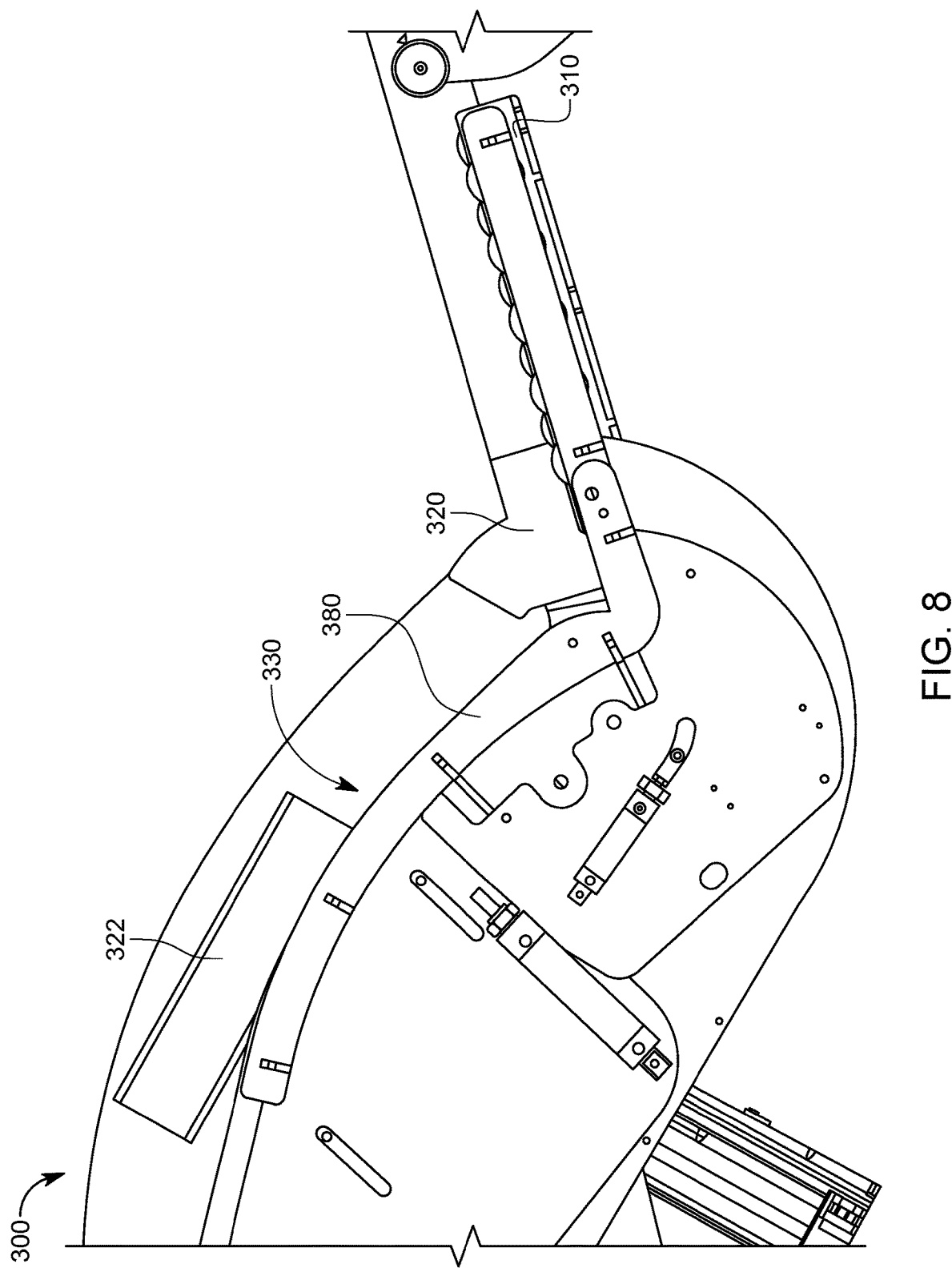
FIG. 8 is an enlarged fragmentary side view of the material infeed assembly of the lumber handling and cutting apparatus of FIG. 1A, showing the inner support member connected to the material infeed assembly.
Figure 9:
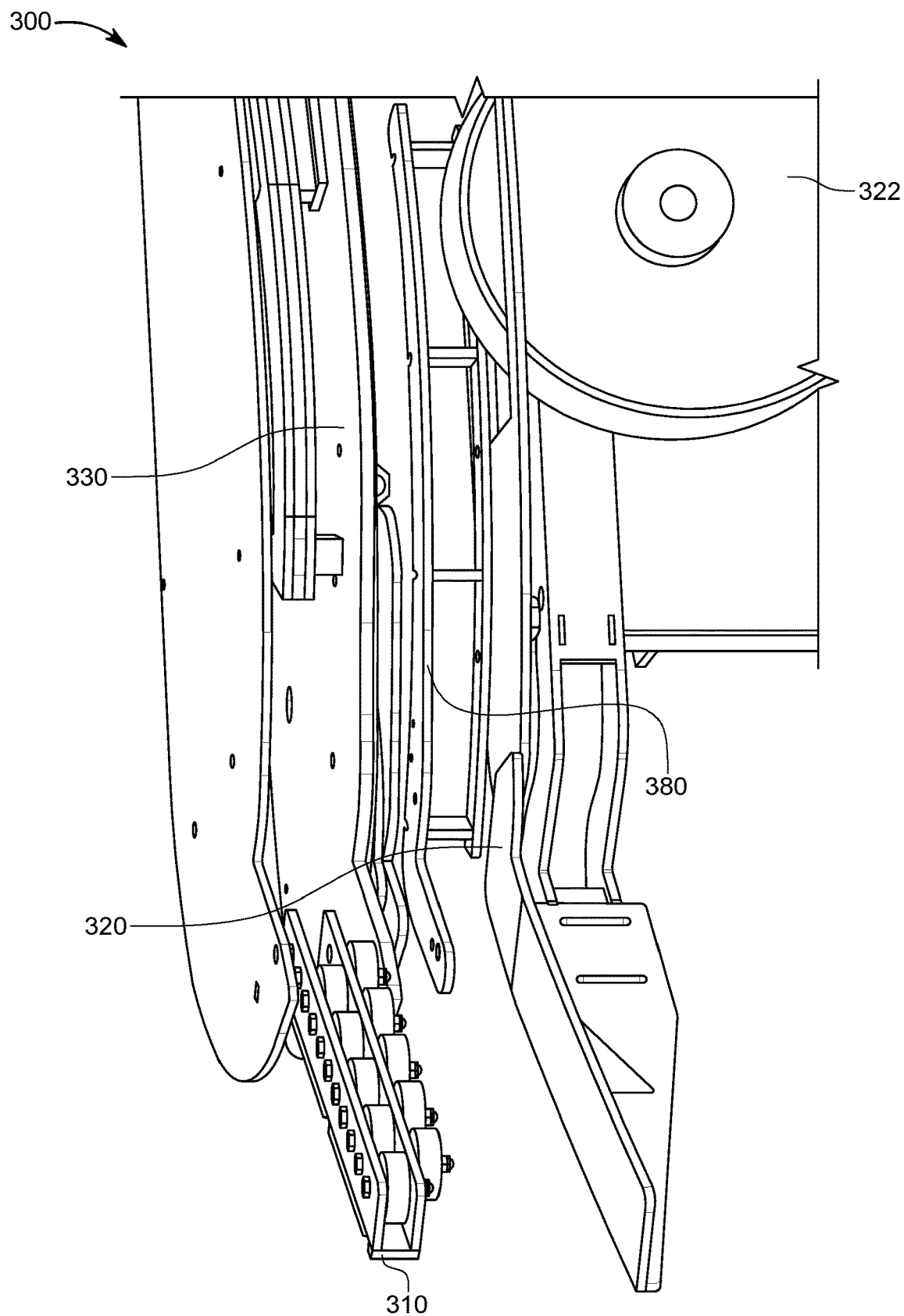
FIG. 9 is an enlarged fragmentary perspective view of the material infeed assembly of the lumber handling and cutting apparatus of FIG. 1A, showing the inner support member connected to the material infeed assembly.
Figure 10:
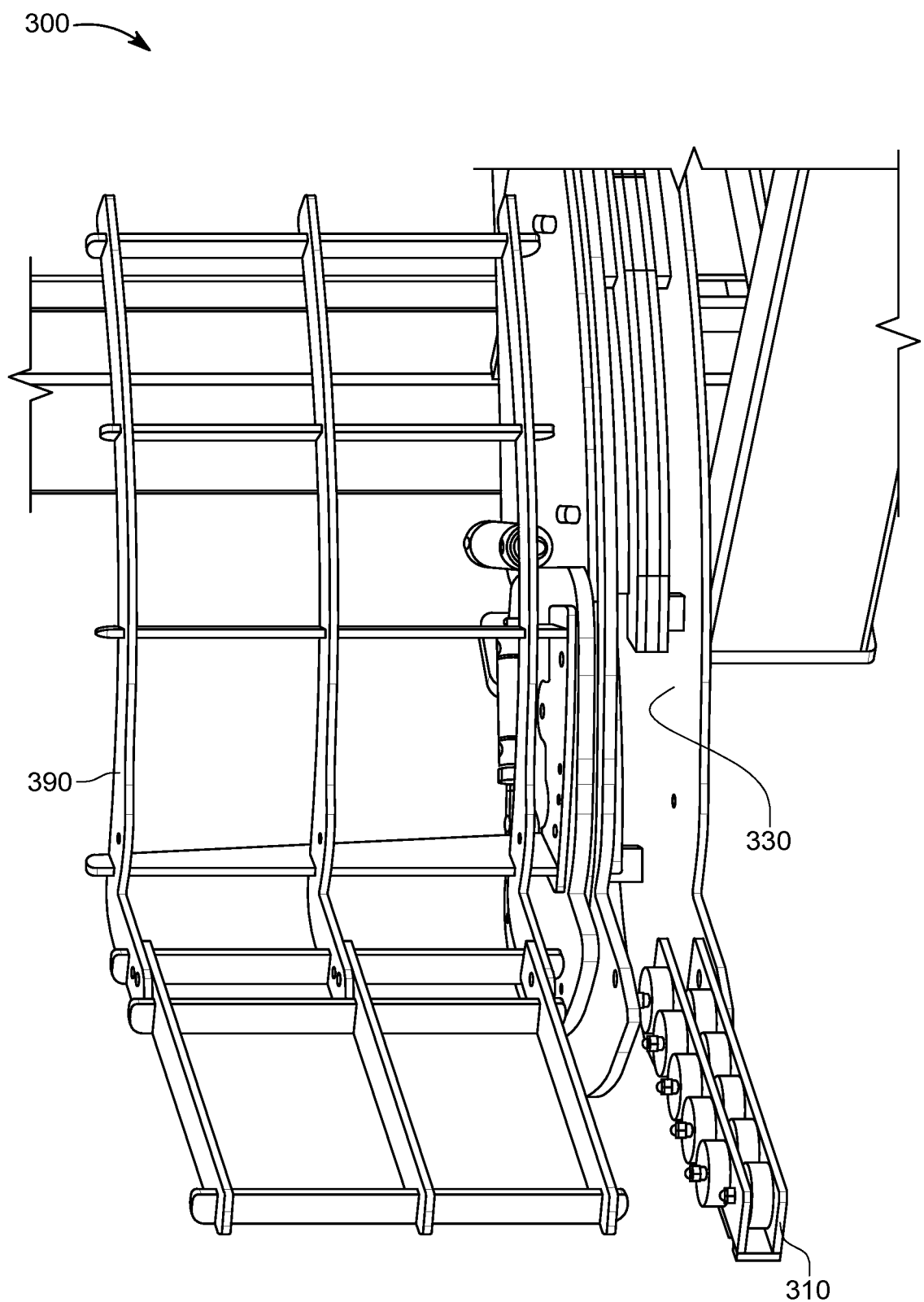
FIG. 10 is an enlarged fragmentary perspective view of the material infeed assembly of the lumber handling and cutting apparatus of FIG. 1A, showing the outer support member connected to the material infeed assembly.
Figure 11:
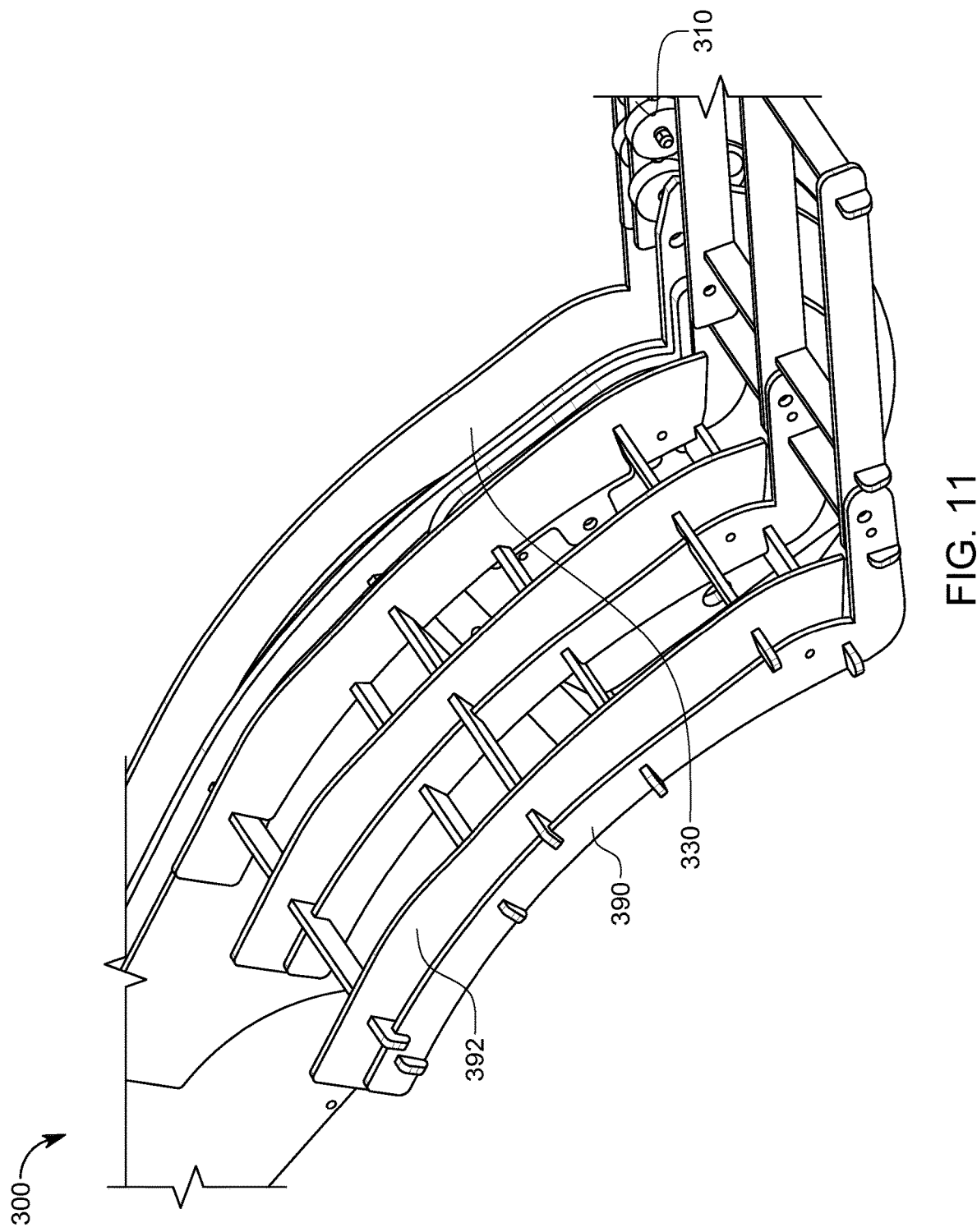
FIG. 11 is an enlarged fragmentary perspective view of the material infeed assembly of the lumber handling and cutting apparatus of FIG. 1A, showing the outer support member including a support adaptor connected to the material infeed assembly for a lumber board oriented 90 degrees to normal.
Figure 12A:
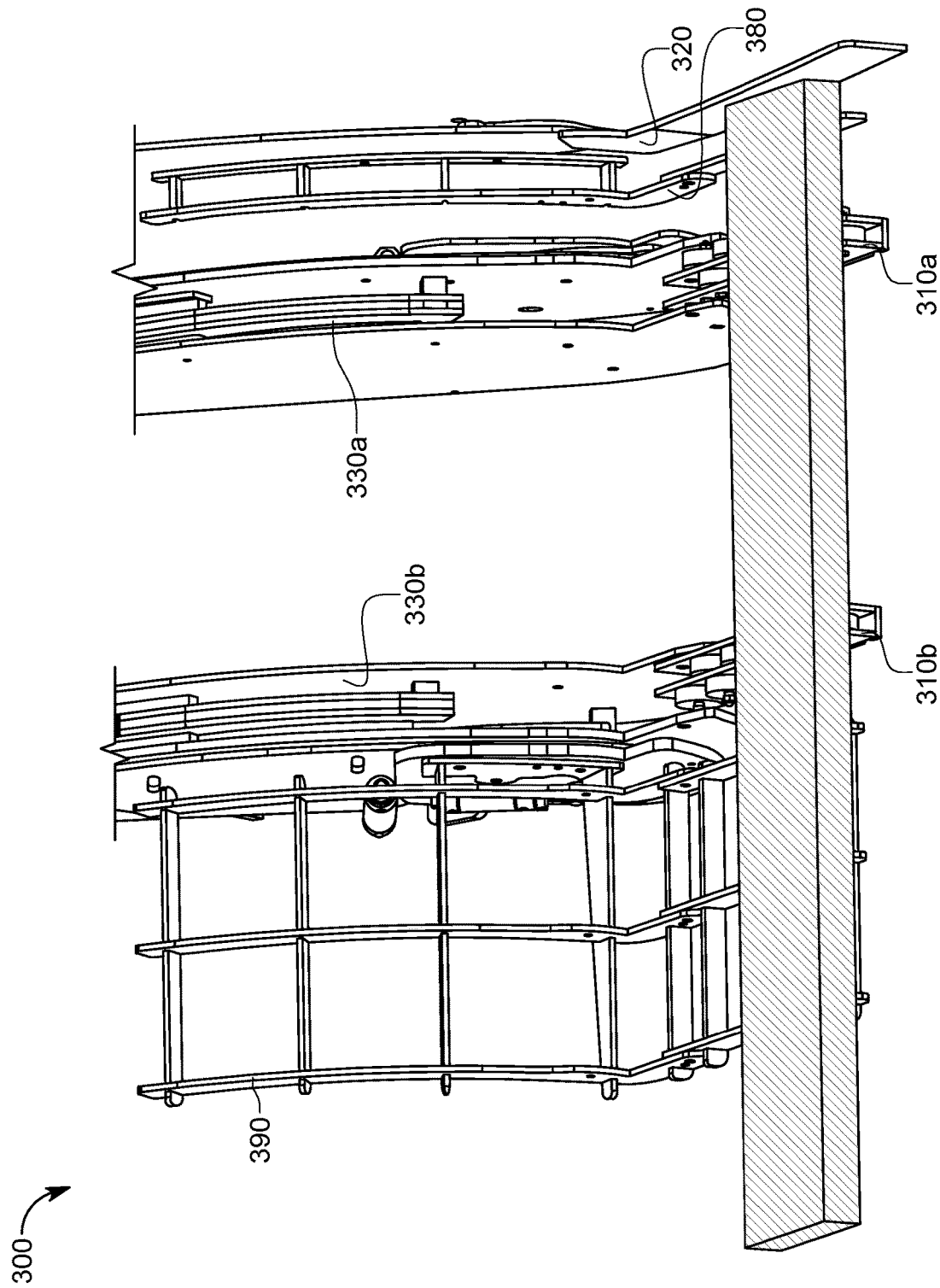
FIGS. 12A to 12D are enlarged fragmentary front perspective views of the material infeed assembly of the lumber handling and cutting apparatus of FIG. 1A, showing the outer support member and the inner support member connected to the material infeed assembly, and showing the progression through the material infeed assembly of the lumber board supported by the outer and inner support members.
Figure 12B:
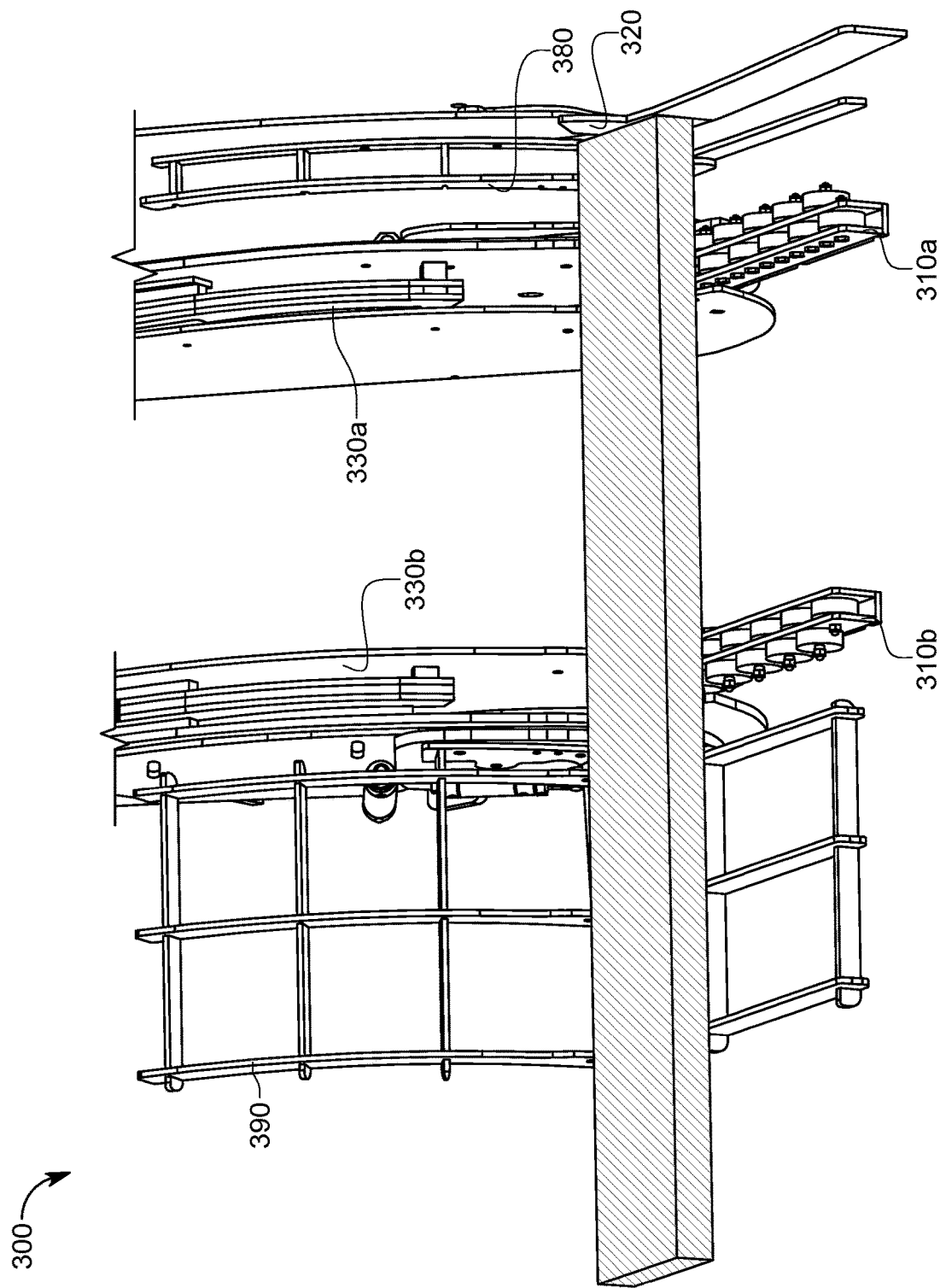
Figure 12C:
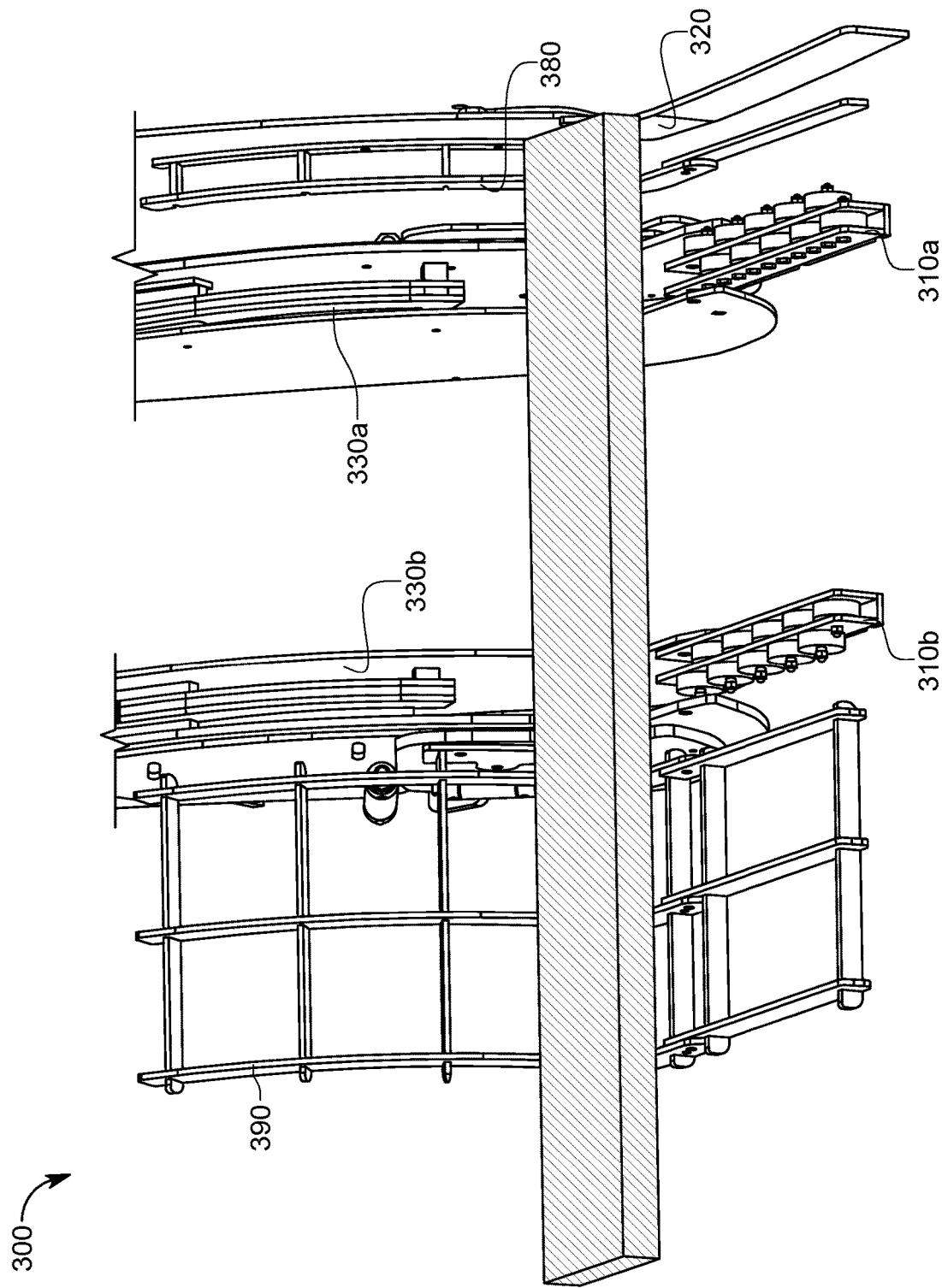
Figure 12D:
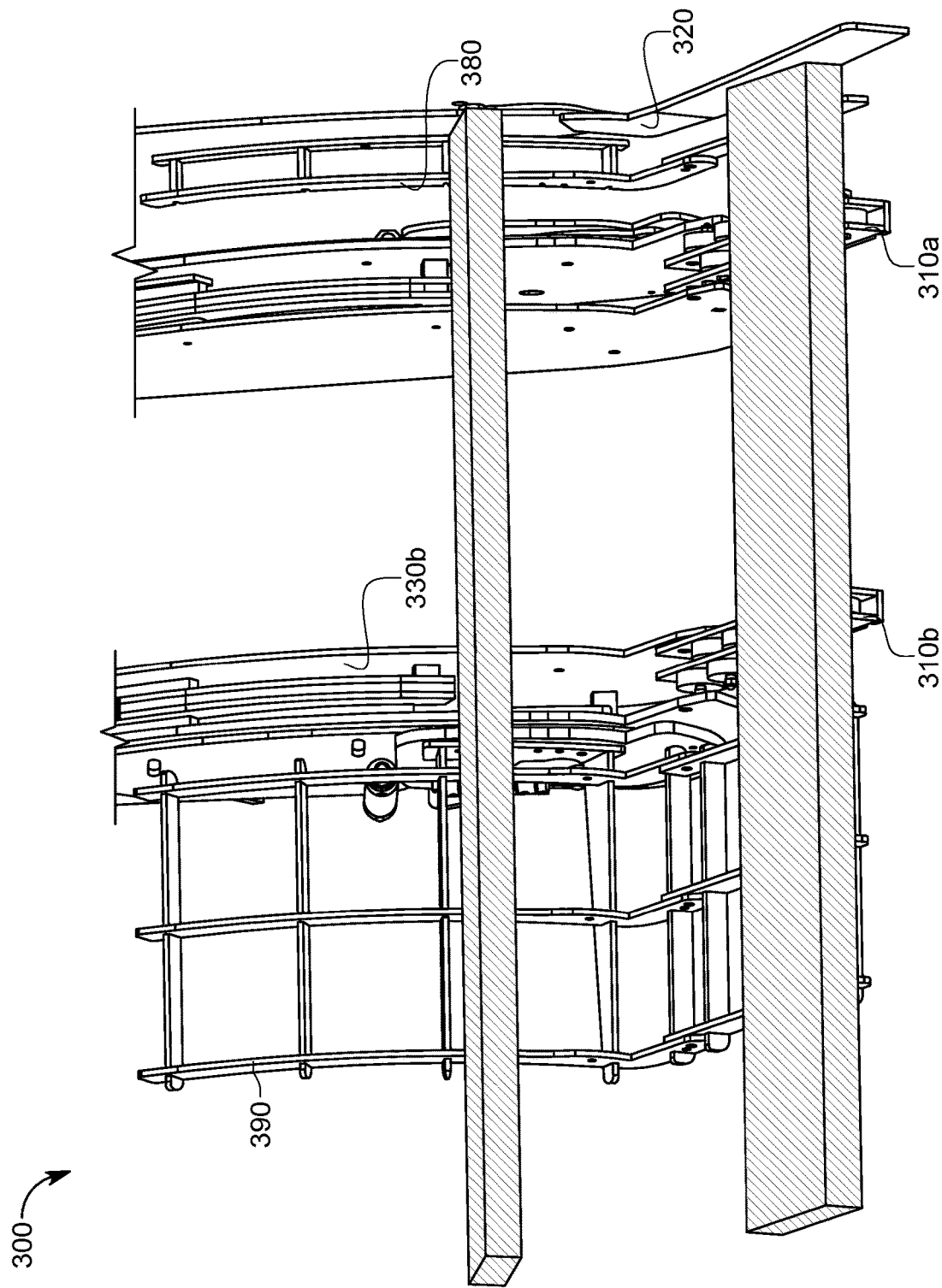
Figure 13A:
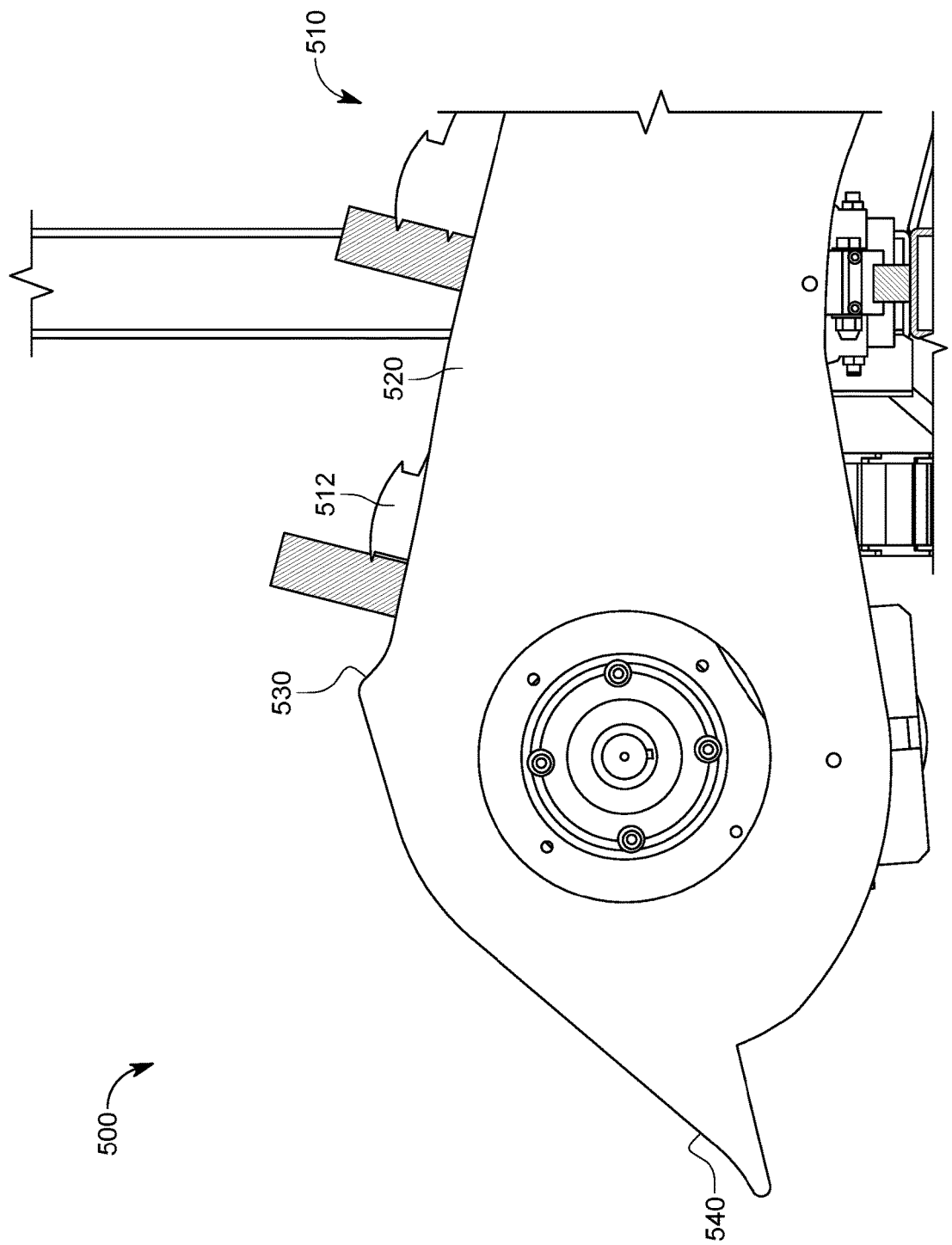
FIGS. 13A to 13E are enlarged fragmentary side views of the material outfeed assembly of the lumber handing and cutting apparatus of FIG. 1A, showing reorientation by the material outfeed assembly of a smaller dimension lumber board after processing by the cutting assembly.
Figure 13B:
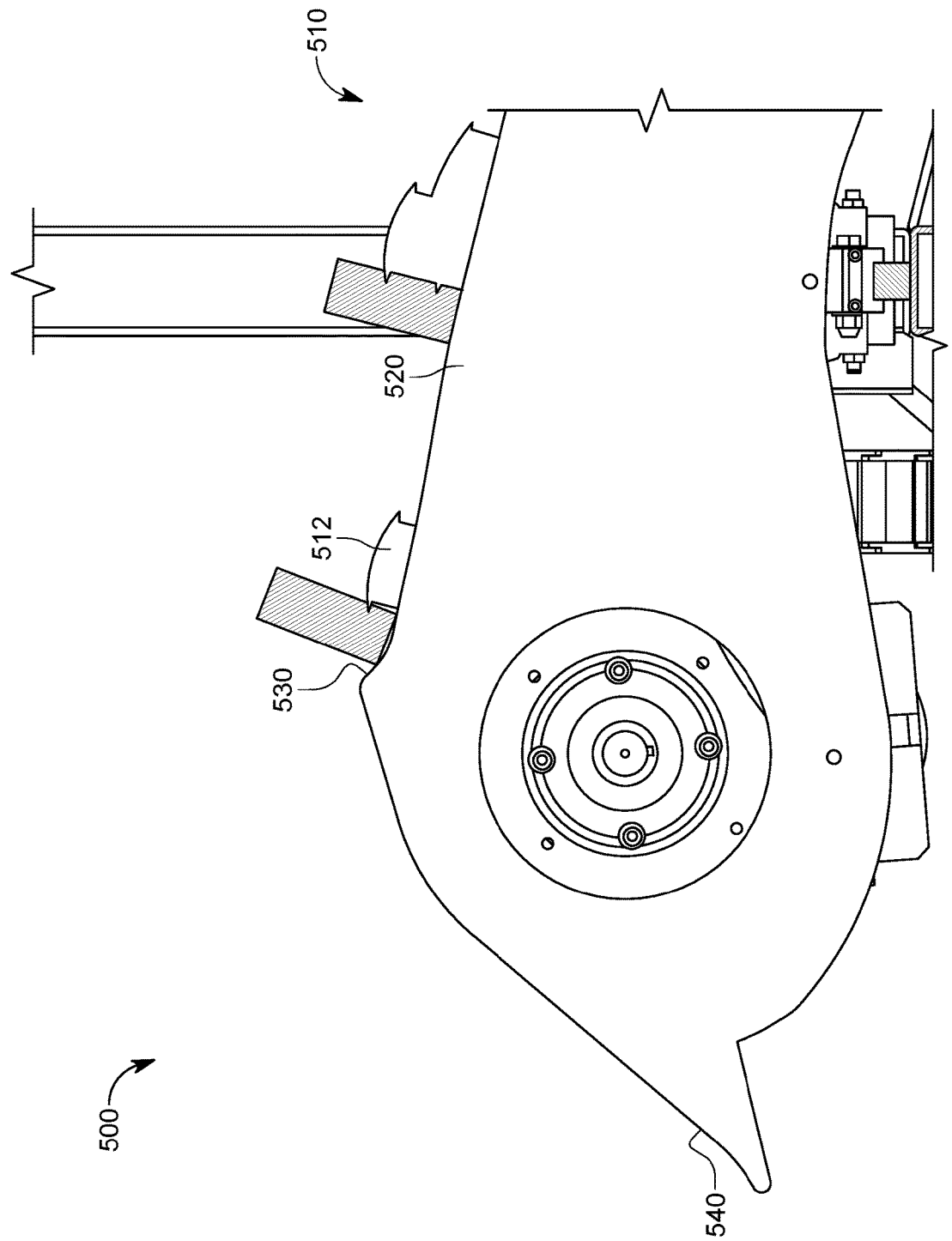
Figure 13C:
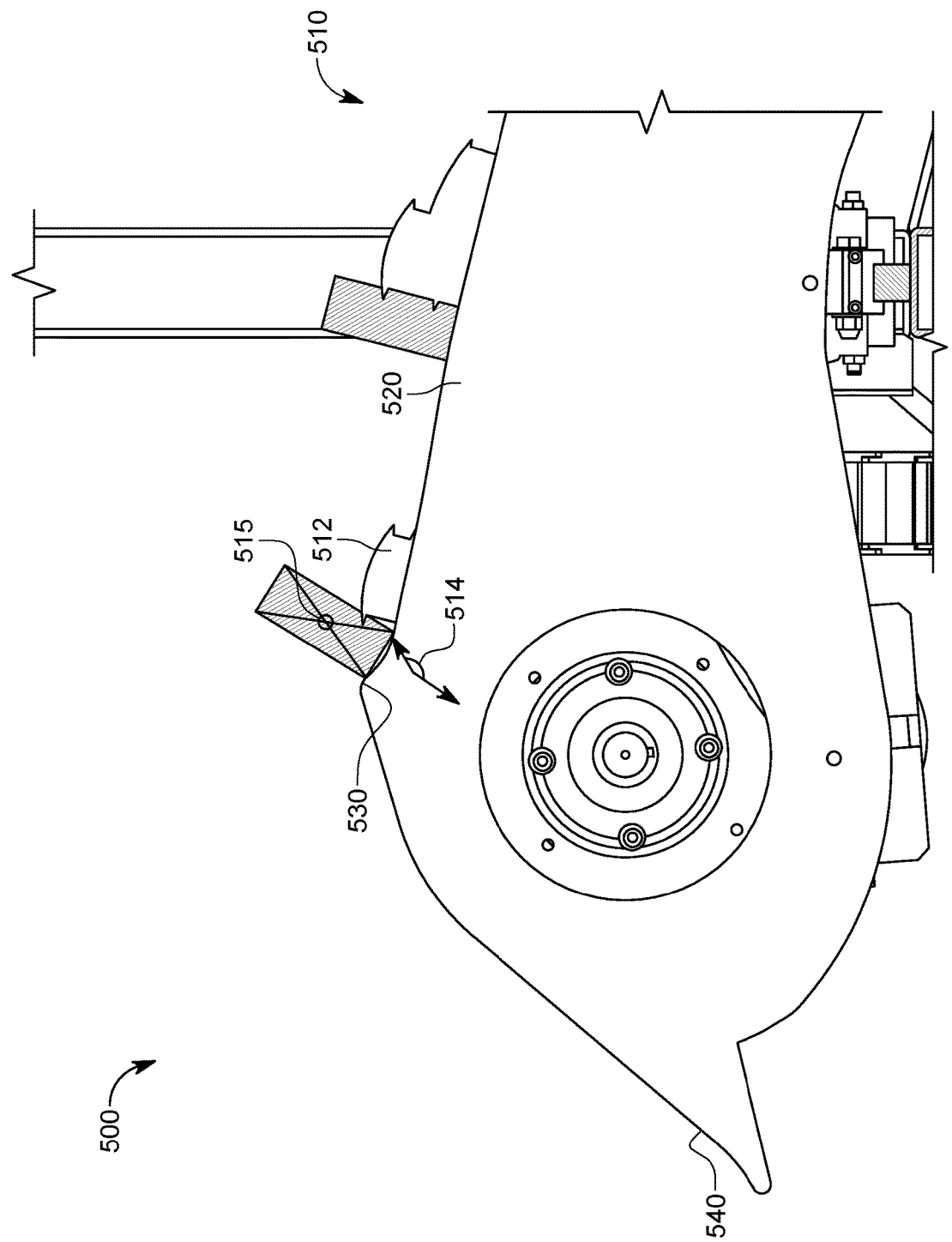
Figure 13D:
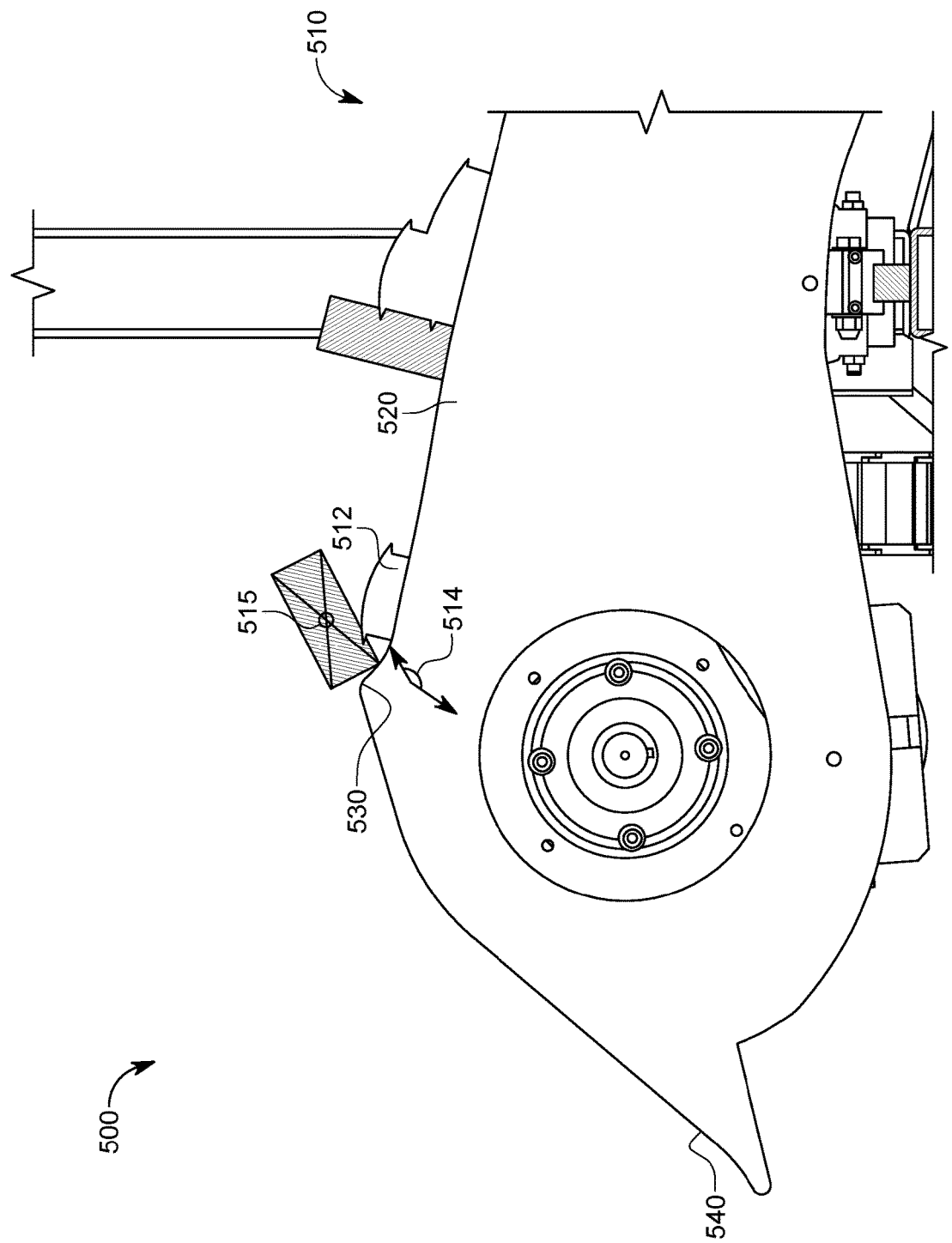
Figure 13E:
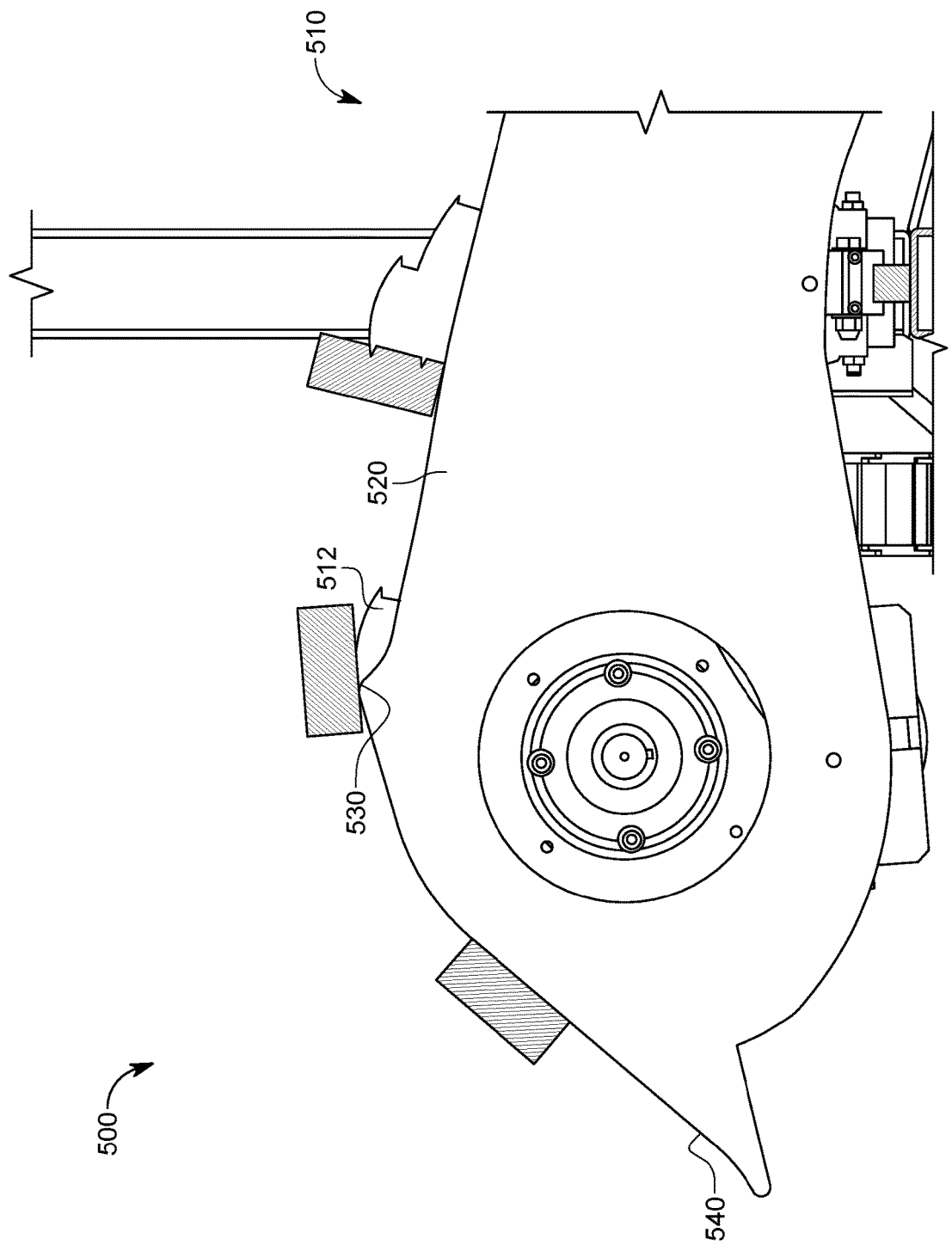
Figure 14A:
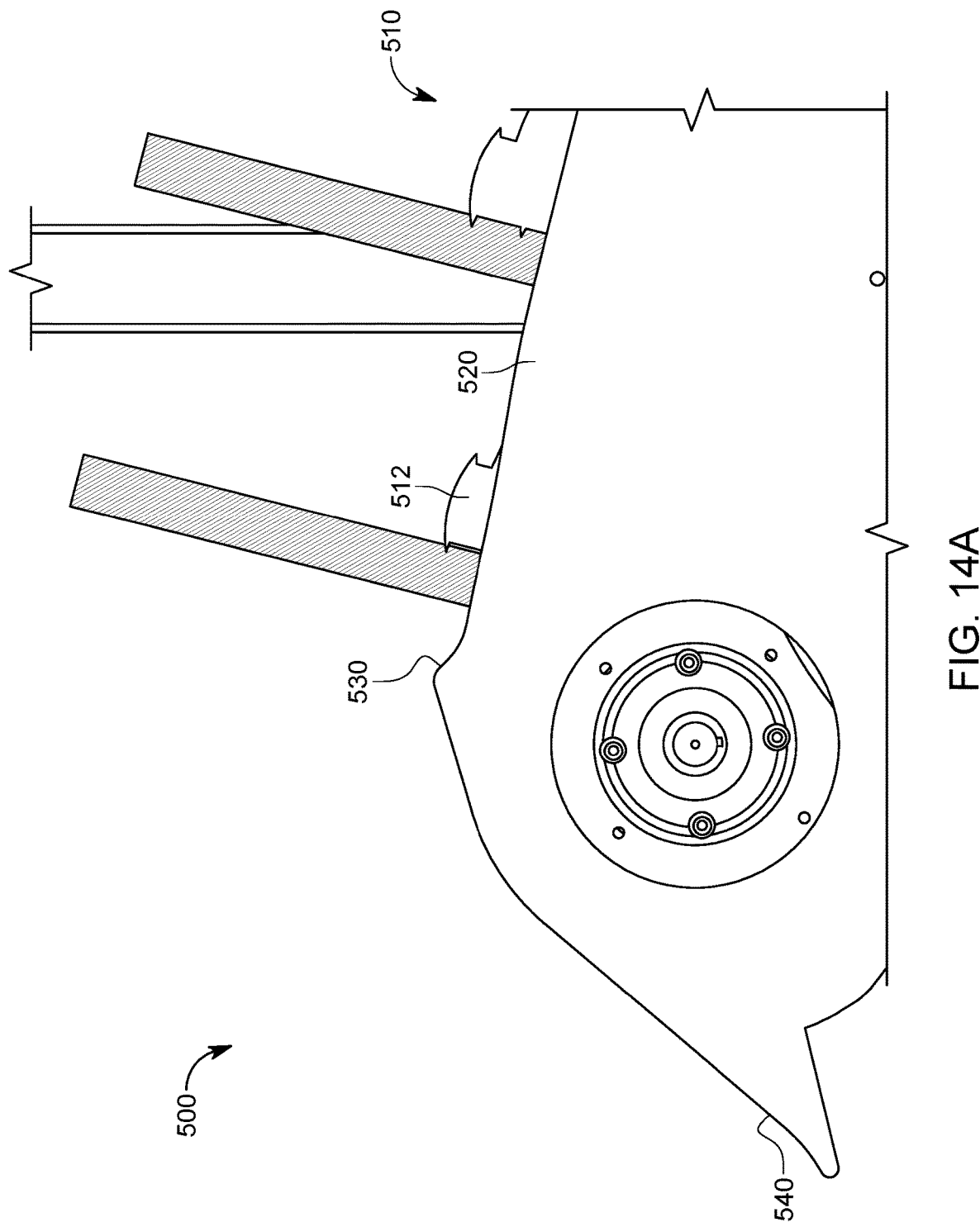
Figure 14B:
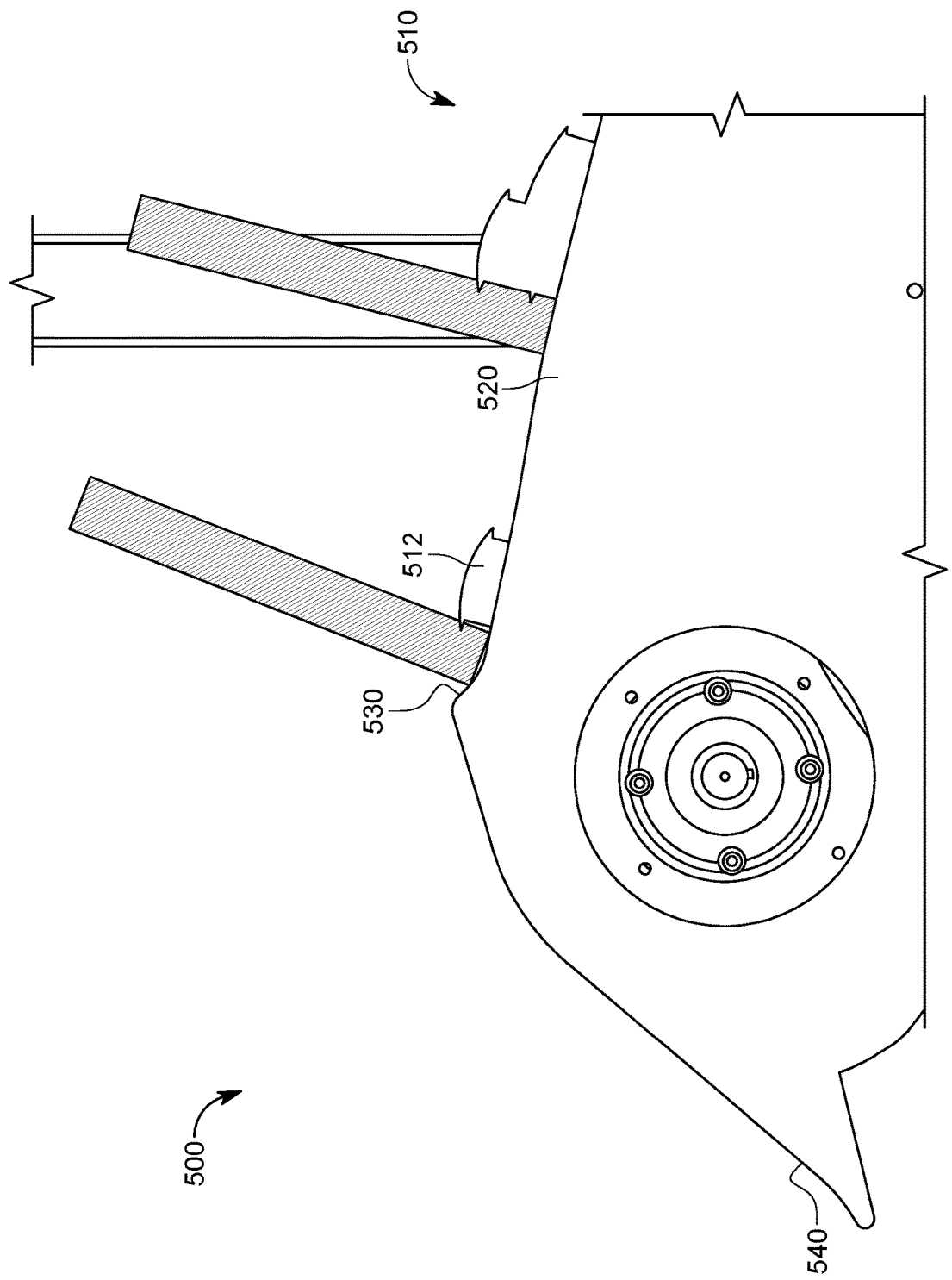
Figure 14C:
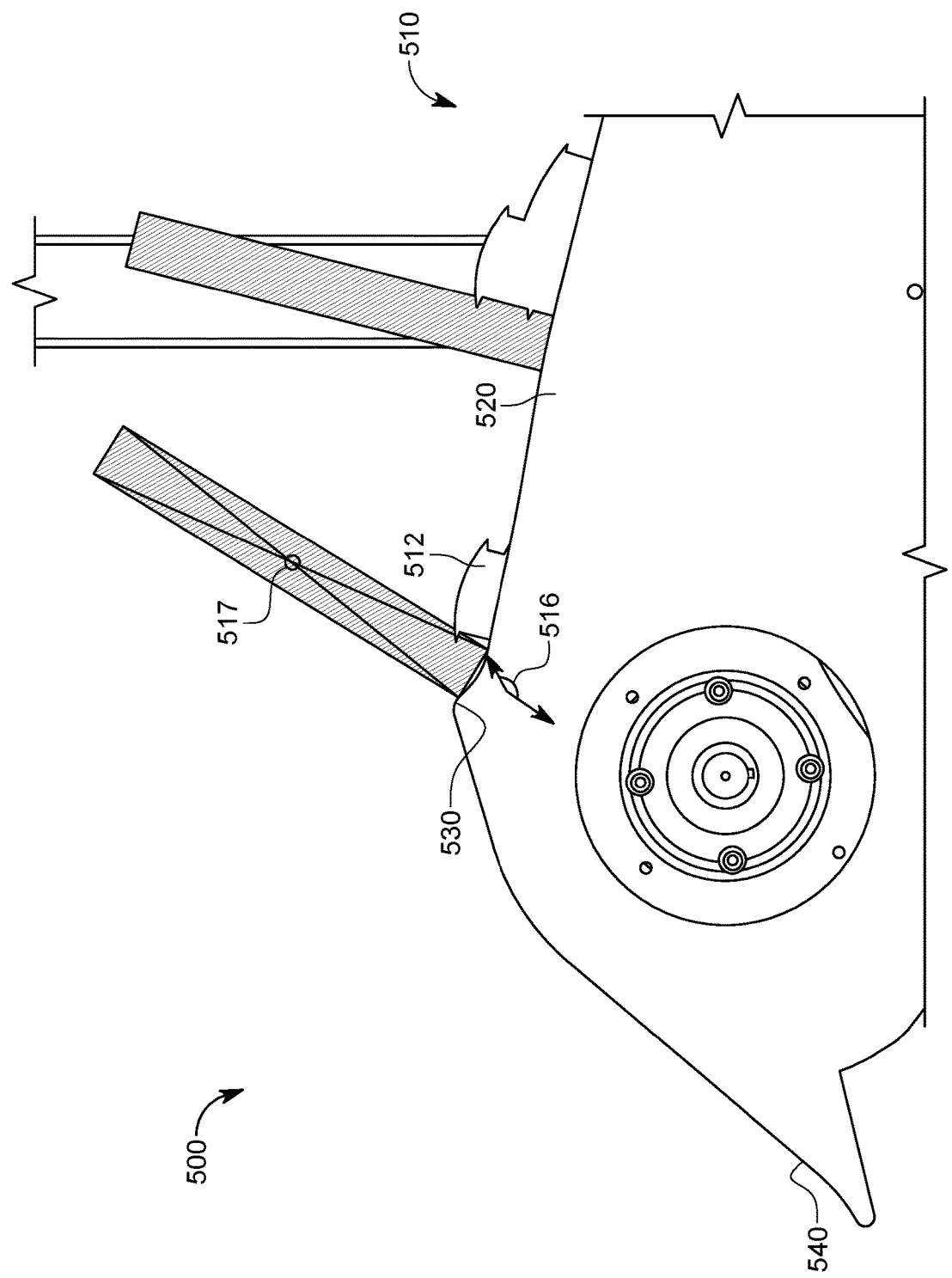
Figure 14E:
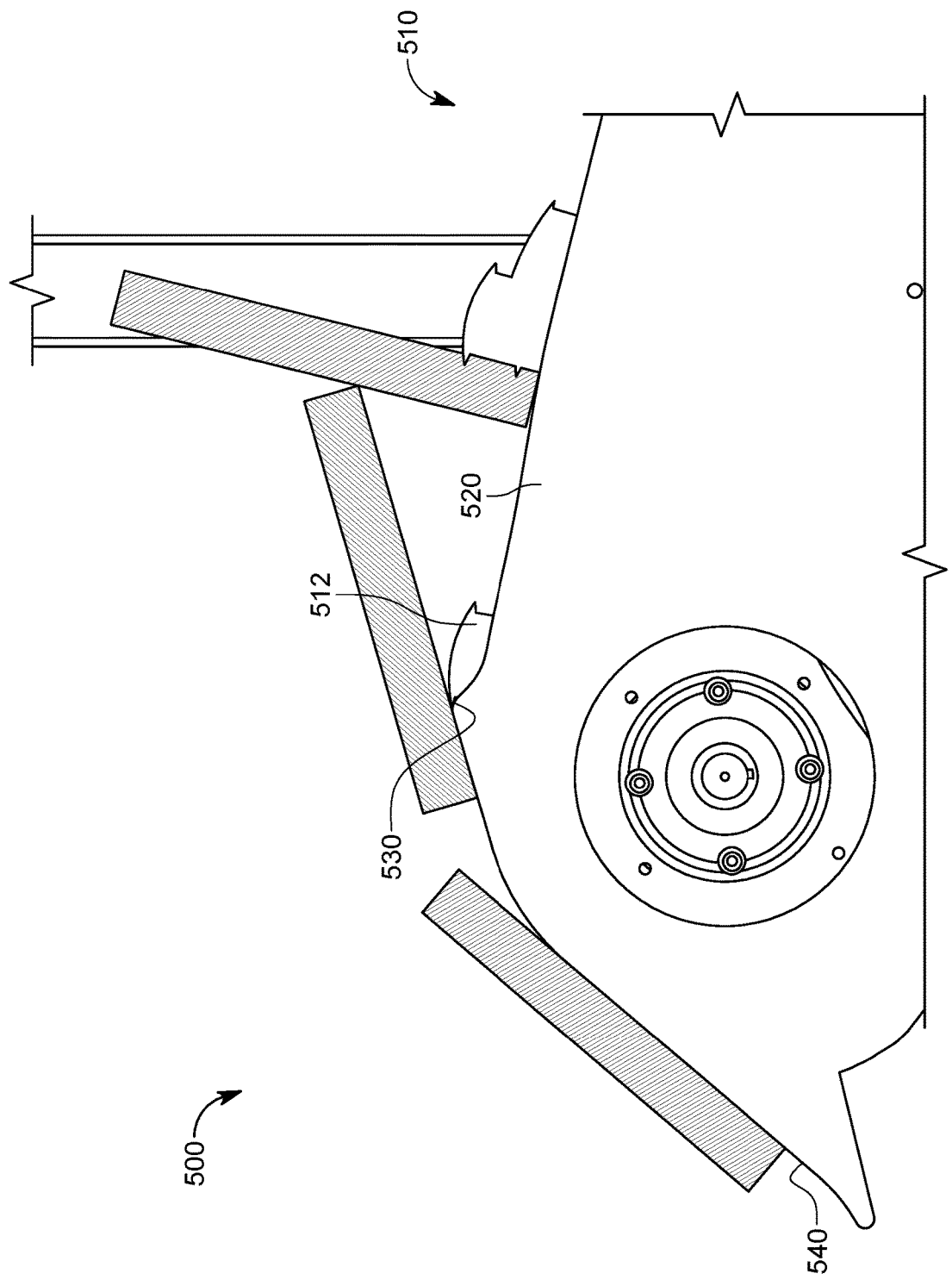

FIGS. 7A to 7E illustrate another example progression through the material infeed assembly 300 of a third example lumber board (not labeled) having a different third size and orientation such as 2×12. In the illustrated example embodiment, lumber board having the 2×12 dimensions and orientation does not require the lifting member 360 to re-orient this lumber board as the lumber board is fed into the dogged chain conveyor 330. Accordingly, as the lumber board is fed from the incoming material conveyor assembly 100, the actuating member 350 remains in a retracted or otherwise non-actuated position, as shown in FIG. 7A. The infeed assembly 300 receives a lumber board on the infeed conveyor 310. The infeed conveyor 310 is sloped such that the lumber board slides down the infeed conveyor 310. The actuating member 350 remains in the retracted position and the lumber board engages with the stop member 320, as shown in FIG. 7B. The plurality of dogs of the dogged chain conveyor 330 grab the 2×12 lumber board in the desired orientation, as shown in FIG. 7C. Accordingly, the dogged chain conveyor 330 receives the lumber board and feeds the lumber board into the cutting assembly 400 of the apparatus 50. The next lumber board can then drop down the infeed conveyor 310 and the progression repeats itself until all of the lumber boards are processed.

It should be appreciated that the apparatus 50 can include one or more sensors (not shown) or other suitable mechanisms (not shown) at one or more of the stations of the apparatus to determine the dimensions of each lumber board processed by the apparatus 50.

It should also be appreciated that the apparatus 50 can include one or more controllers (not shown) or other suitable mechanisms (not shown) to receive inputs from such sensors or other suitable mechanisms to control each of the different stations and operations of the apparatus 50.

In various embodiments, the apparatus 50 may include the infeed conveyor 310 as or in the form of two or more infeed conveyors such as infeed conveyors 310a and 310b; and may include the dogged chain conveyor 330 as or in the form of two or more dogged chain conveyors such as conveyors 330a and 330b spaced apart from one another. One such example embodiment is shown by infeed conveyors 310a and 310b and dogged chain conveyors 330a and 330b in FIGS. 8 to 12D. It should also be appreciated that in certain such example embodiments, each infeed conveyor 310a and 320b may include a lifting member 360 and an actuating member 350 for orienting each lumber board as that lumber board is fed from the infeed conveyors 310 to the dogged chain conveyors 330a and 330b.

FIGS. 8 to 11 and 12A to 12D illustrate one example embodiment of the infeed assembly 300 that includes the example inner and outer support members 380 and 390 suitably connected to the infeed conveyor 310. In this illustrated example embodiment, the apparatus 50 has two infeed conveyors 310a and 310b, spaced apart from one another. Furthermore, the apparatus 50 includes two dogged chain conveyors 330a and 330b configured to receive lumber boards from the infeed conveyors 310a and 310b. The inner support member 380 is connected to and supports the stop member 320 and a lumber alignment member 322 of the infeed conveyor 310a (e.g., the infeed conveyor on the right side of apparatus 50). As a result, the inner support member 380 provides support such that the lumber board does not fall off the inside portion of the infeed conveyor 310a. Additionally, the outside support member 390 is suitably connected to and supports the infeed conveyor 310b (e.g., the infeed conveyor on the left side of the apparatus 50). The outer support member 390 supports the lumber board such that the apparatus 50 may process incoming lumber boards that are longer (e.g., one foot or more longer) than the desired final cut length of such lumber boards. As such, the inner and outer support members 380 and 390 are configured to support each lumber board as the lumber board traverses along the infeed conveyor 310a and 310b and up along the sides of the dogged chain conveyor 330a and 330b until the dogs establish a grip on the lumber board.

FIGS. 12A to 12D illustrate one example progression of a lumber board (not labeled) through the material infeed assembly 300 while the lumber board is supported by the inner and outer support members 380 and 390. In the illustrated example, the apparatus 50 feeds the lumber board forward at a set speed. The lumber board traverses down the infeed conveyors 310a and 310b towards the dogged chain conveyor 330a and 330b. If the lumber board traversing down the infeed conveyors 310a and 310b is unstable, the respective first downwardly inclined portions (not separately labeled) of the inner and outer support members 380 and 390 will support the lumber board such that the lumber board does not tip or otherwise fall off of the infeed conveyors 310a and 310b. As the lumber board traverses down the infeed conveyors 310a and 310b, the lumber board is grabbed by one or more dogs of the dogged chain conveyors 330a and 330b. The lumber board then traverses up the dogged chain conveyors 330a and 330b following the contour of the dogged chain conveyors 330a and 330b. In the illustrated example, the one or more dogs temporarily release the lumber board at a transition point between the material infeed assembly 300 and the cutting assembly 400. The lumber alignment member 322 (e.g., alignment wheel) aligns the lumber board at this transition point prior to processing of the lumber board by the cutting assembly 400. The respective second upwardly curved portions (not separately labeled) of the inner and outer support members 380 and 390 are configured to maintain support of the lumber board while allowing the lumber board to slide during lumber alignment by the lumber alignment member 322. Following the lumber alignment, one or more dogs of the dogged chain conveyors 330a and 330b grip or re-grip the lumber board in the aligned position. The lumber board is now properly aligned and ready for processing by the cutting assembly 400. As a result, the lumber board no longer needs support by the inner and outer support members 380 and 390. The dogged chain conveyors 330a and 330b then feed the lumber board into the cutting assembly 400.

In various embodiments, the inner and outer support members 380 and 390 are shaped to follow the top contour of the side plates of dogged chain conveyors 330a and 330b. Such contours of the inner and outer support members 380 and 390 enable the material infeed assembly 300 to maintain contact with and support of the lumber board as the lumber board traverses from the infeed conveyors 310a and 310b and up the dogged chain conveyors 330a and 330b.

In various example embodiments, the inner and outer support members 380 and 390 are connected to the infeed conveyors 310a and 310b with a suitable pivot member (not shown or labeled) to adjust the position of the inner and outer support members 380 and 390 with respect to the infeed conveyors 310a and 310b and the dogged chain conveyors 330a and 330b.

In various embodiments, the inner and outer support members 380 and 390 further include one or more mounting positions (not labeled) for sensors and other components of the apparatus 50. The one or more mounting positions may be configured to protect the sensors from the incoming lumber and moving components of the apparatus 50.

It should be appreciated from the above that in various embodiments the apparatus 50 may be set up for processing lumber boards having different dimensions and/or orientations. For example, if the apparatus 50 is set up to process lumber with different dimensions and orientation such as 4×2, and/or 3×2, the outer support member 390 may further include a support structure that is positioned on top of the outer support member 390. The support structure may be suitably connected to the outer support structure 390 with a plurality of pins or other such suitable fasteners.

It should be appreciated from the above that in various embodiments, the inner and outer support members 380 and 390 are configured to provide support for each lumber board at a transition point between the infeed conveyors 310a and 310b and the dogged chain conveyors 330a and 330b. The inner and outer support members 380 and 390 maintain support of the lumber board as the lumber board traverses along the dogged chain conveyors 330a and 330b.

It should be appreciated from the above that in various embodiments, the inner and outer support members 380 and 390 are configured to support each lumber board at an alignment point along the dogged chain conveyors 330a and 330b. For example, the alignment point is at the location where the dogged chain conveyor 330a passes the lumber alignment wheel 322. It should be appreciated from the above that at this alignment point, the dogs of the dogged chain conveyors 330a and 330b may loosen the grip on the lumber board to enable the lumber alignment member 322 to align the lumber board for processing by the cutting assembly 400. The inner and outer support members 380 and 390 support the lumber board during this alignment by the lumber alignment member 322.

It should be further be appreciated from the above that after each lumber board is received and properly oriented, the material infeed assembly 300 feeds the lumber board to the cutting assembly 400. The cutting assembly 400 is configured to cut or otherwise process each lumber board that is fed into the apparatus 50. More specifically, as best shown in FIGS. 1A to 4E, the example cutting assembly 400 includes: (1) a cutting support frame 410; (2) a cutting conveyor 420 supported by the cutting support frame 410; (3) a saw assembly 430 supported by and suitably connected to the cutting support frame 410; and (4) a saw enclosure member 440 supported by the cutting support frame 410 such that the saw assembly 430 is enclosed. The cutting conveyor 420 is suitably connected to the dogged chain conveyor 330 of the material infeed assembly 300. As such, the cutting assembly 400 receives a lumber board from the material infeed apparatus 300 and processes (e.g., cuts or saws) that lumber board according to the desired final dimensions for that lumber board. It should be appreciated that in this illustrated example embodiment, the cutting conveyor 420 and the saw assembly 430 are obscured by the saw enclosure member 440 and therefore labeled using dashed lines.

In various embodiments, the dogged chain conveyor 330, the cutting conveyor 420 and the saw assembly 430 are each supported by and suitably attached to the cutting support frame 410 of the cutting assembly 400.

The material outfeed assembly 500 is configured to orient and/or reorient each of the lumber boards such that each lumber board ends up on a specific side following processing by the cutting assembly 400. As illustrated in FIGS. 1A, 1B, 1C, and 13A to 14E, the material outfeed assembly 500 includes: (1) an outfeed conveyor 510 connected to the cutting conveyor 420; (2) an outfeed orientation member 520 suitably attached on either side of the outfeed conveyor 510; (3) an outfeed orienter 530 defined in the outfeed orientation member 520; and (4) an outfeed slide portion 540 defined in the orientation member 520.

FIGS. 13A to 13E and 14A to 14E illustrate one example material outfeed assembly 500 of the present disclosure that is configured to receive and reorient a variety of different lumber sizes as the lumber is output from the cutting assembly 400. In the illustrated example, the material outfeed assembly 500 is configured to lift at least one edge of each lumber board as that lumber board comes out of the cutting assembly 400. As a result, the lumber board rotates such that the lumber board falls in a controlled manner onto a specific side as the lumber board is fed out of the apparatus 50.

As best seen in FIGS. 13A to 13E, the progression of a lumber board (not labeled) having a first size and orientation (e.g., 4×2) along the material outfeed assembly 500 is shown. The lumber board is pushed or otherwise fed along the outfeed conveyor 510 by an outfeed conveyor dog 512. The lumber board traverses along the outfeed orienter 530 such that the lumber board rotates about a top portion (not labeled) of an outfeed conveyor dog 512 before the lumber board is released to the outgoing material conveyor assembly 600. More specifically, the outfeed orienter 530 is shaped to define or otherwise include an incline portion 532 (facing the cutting assembly 400) that enables the outfeed orienter 530 to tip or rotate the lumber board. Accordingly, as the lumber board traverses along the outfeed orienter 530, the incline portion 532 is configured to cause rotation of the lumber board about the top of the outfeed conveyor dog 512 at an angle 514 that is past the center of gravity 515 for the lumber board. Thus, the lumber board tips over in a controlled and desired manner to reorient the lumber board as the lumber board is fed out of the apparatus 50. Once the lumber board is reoriented onto the desired side, the lumber board traverses down the slide portion 540 of the material outfeed assembly 500. The lumber board then is received by the outgoing material conveyor assembly 600 where one or more of the operators remove the processed marked and cut lumber board from the apparatus 50.

Referring now to FIGS. 14A to 14E, the progression of a lumber board (not labeled) having a different second size and orientation (e.g., 2×12) along the material outfeed assembly 500 is shown. The lumber board is pushed or otherwise fed along the outfeed conveyor 510 by an outfeed conveyor dog 512. The lumber board traverses along the outfeed orienter 530 such that the lumber board rotates about a top portion (not labeled) of the outfeed conveyor dog 512 before the lumber board is released to the outgoing material conveyor assembly 600. More specifically, the outfeed orienter 530 is shaped to define or otherwise include an incline portion 532 facing the cutting assembly 400 that enables the outfeed orienter 530 to tip or rotate the lumber board. Accordingly, as the lumber board traverses along the outfeed orienter 530, the incline portion 532 is configured to cause rotation of the lumber board at an angle 516 that is past a center of gravity 517 for the lumber board. Thus, the lumber board tips over in a controlled and desired manner as the lumber board is fed out of the apparatus 50. Once the lumber board is reoriented onto the desired side, the lumber board traverses down the slide portion 540 of the material outfeed assembly 500. The lumber board is then received by the outgoing material conveyor assembly 600 where one of the operators removes the processed marked and cut lumber board from the apparatus 50.

In various embodiments, the material outfeed assembly 500 is configured such that the lumber board is reoriented as the lumber board is fed out of the apparatus 50. For example, the material outfeed assembly 500 may re-orient the lumber board such that a printed lumber board surface is released from the apparatus face up. Thus, as the lumber board is fed out of the apparatus 50 the operators can clearly view the printing or marking without having to manually re-orient the lumber board. This may reduce the amount of lumber handling by the operators. As a result, the material outfeed assembly 500 may provide improved throughput of the apparatus 50 and improved safety for the operators.

In various embodiments, the material outfeed assembly 500 includes a flap (not shown) or other such member (not shown) that aids the outfeed orienter 530 to flip and/or rotate the lumber board onto the desired side. For example, the flap may be axially aligned with and positioned axially above the outfeed orienter 530 such that the flap contacts a lumber board surface or edge as the lumber board traverses up the incline portion 532. Thus, the flap may help to tip the lumber board over in the controlled and desired manner.

In various embodiments, the apparatus 50 may have two or more outfeed assemblies 500 spaced apart from one another like the infeed conveyors 310a and 310b and dogged chain conveyors 330a and 330b of FIGS. 8 to 12D. Accordingly, the apparatus 50 may include a plurality of outfeed orientation members 520. For example, the apparatus includes one outfeed orientation member 520 suitably attached on either side of each outfeed conveyor 510 of the two outfeed assemblies 500. Thus, the outfeed assemblies 500 may include at least four outfeed orientation members 520 configured to reorient the lumber board as the lumber board is fed out of the apparatus 50.

The outgoing material conveyor assembly 600 is configured to receive the processed lumber board in the desired orientation as the lumber board is fed or otherwise output from the apparatus 50. More specifically, the outgoing material conveyor assembly 600 includes: (1) a support frame 610; and (2) a plurality of material receiving members 620 supported by and suitably connected to the support frame 610. The outgoing material conveyor assembly 100 thus provides a suitable support structure for receiving and conveying material such as the lumber processed by the apparatus 50.

In various embodiments of the present disclosure, the infeed assembly 300, the cutting assembly 400, and the outfeed assembly 500 are adjacently positioned with respect to one another and individually fastened via suitable fasteners (such as bolts) to the work area floor.

In various embodiments of the present disclosure, the printer assembly 200 is supported by and suitably connected to the cutting support frame 410 of the cutting assembly 400.

In various embodiments of the present disclosure, the printer assembly 200 is adjacently positioned and/or connected to the material infeed assembly 300.

In various embodiments, the apparatus 50 includes two material infeed assemblies 300 that are spaced apart from one another. Each material infeed assembly 300 includes a dogged chain conveyor 330 that conveys lumber boards through the apparatus 50. As such, the dogged chain conveyor 330 can be a continuous conveyor through the apparatus 50. For example, each dogged chain conveyor 330 may grab lumber boards from the infeed conveyor 310 and convey the lumber boards through the cutting conveyor 420. In such embodiments, the saw assembly 430 makes cuts to the lumber boards held and conveyed by the dogged chain conveyor 330 through the cutting assembly 400 and out through the material outfeed assembly 500. The dogged chain conveyor 330 then releases the processed lumber boards that are received by the outgoing material conveyor assembly 600.

In various embodiments, each of the dogged chain conveyors 330 may be split up into two or more non-continuous conveyors that hold and convey lumber boards through the apparatus 50.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The claims are as follows:

1. A lumber handling and cutting apparatus comprising:
   an incoming material conveyor assembly;
   a material infeed assembly adjacent to the incoming material conveyor assembly;
   a cutting assembly adjacent to the material infeed assembly; and
   a printer assembly adjacent to the incoming material conveyor assembly, the printer assembly comprising:
   a printer support base;
   a printer support frame supported by and connected to the printer support base;
   a printer support arm supported by and connected to the printer support frame;
   a print head mounting bracket connected to the printer support arm;

a print head supported by and connected to the print head mounting bracket, the print head configured to print on a lumber board as the lumber board passes the print head;

a multi-size board alignment assembly at an end of the incoming material conveyor assembly adjacent to the material infeed assembly, wherein the multi-size board alignment assembly is configured to align the lumber board with respect to the print head prior to the print head printing on the lumber board; and a print sensor configured to detect the lumber board and to cause activation of the print head, wherein the incoming material conveyor assembly is configured to, after the lumber board is aligned with the print head, back the lumber board up before feeding the lumber board to the material infeed assembly, and wherein the multi-size board alignment assembly is configured to, at a point the lumber board is over halfway underneath the print head and a lumber board center of gravity passes over a center of the multi-size board alignment assembly, allow the lumber board to feed downwardly into the material infeed assembly.

2. The lumber handling and cutting apparatus of claim 1, wherein the print head is positioned facing downwardly.

3. The lumber handling and cutting apparatus of claim 1, wherein the print head is positioned at a transition point between the incoming material conveyor assembly and an infeed conveyor of the material infeed assembly.

4. The lumber handling and cutting apparatus of claim 3, wherein the printer support frame is configured such that the printer support arm is above the transition point.

5. The lumber handling and cutting apparatus of claim 1, wherein the print head mounting bracket is attached to the printer support arm such that the print head is positioned above a transition point between the incoming material conveyor assembly and an infeed conveyor of the material infeed assembly.

6. The lumber handling and cutting apparatus of claim 1, wherein the multi-size board alignment assembly is connected to feed members of the incoming material conveyor assembly.

7. The lumber handling and cutting apparatus of claim 6, wherein the multi-size board alignment assembly includes an idler roller positioned at an end of one of the feed members of the incoming material conveyor assembly.

8. The lumber handling and cutting apparatus of claim 6, wherein the multi-size board alignment assembly is positioned at a transition point between the feed members of the incoming material conveyor assembly and the infeed conveyor of the material infeed assembly.

9. The lumber handling and cutting apparatus of claim 1, wherein the multi-size board alignment assembly is configured to align the lumber board with respect to the print head for a period of time as the lumber board passes underneath the print head.

10. The lumber handling and cutting apparatus of claim 9, wherein the incoming material conveyor assembly is configured to deliver the lumber board such that the lumber board can be aligned under the print head prior to passing underneath the print head for the period of time.

11. The lumber handling and cutting apparatus of claim 1, wherein the multi-size board alignment assembly is attached to the material infeed assembly.

12. A lumber handling and cutting apparatus comprising:
an incoming material conveyor assembly;
a material infeed assembly adjacent to the incoming material conveyor assembly;
a cutting assembly adjacent to the material infeed assembly; and
a printer assembly adjacent to the incoming material conveyor assembly, the printer assembly comprising:
a print head;
a multi-size board alignment assembly at an end of the incoming material conveyor assembly adjacent to the material infeed assembly, wherein the multi-size board alignment assembly is configured to align a plurality of different lumber boards of different dimensions with respect to the print head prior to the print head printing on each of the plurality of different lumber boards without adjusting a position of the print head and without reconfiguring the print head; and
a print sensor configured to detect the lumber board and to cause activation of the print head,
wherein the incoming material conveyor assembly is configured to, after each of the lumber boards is aligned, back each lumber board up before feeding each lumber board to the material infeed assembly, and
wherein the multi-size board alignment assembly is configured to, for each of the plurality of different lumber boards, at a point that said lumber board is over halfway underneath the print head and a lumber board center of gravity of said lumber board passes over a center of the multi-size board alignment assembly, allow said lumber board to feed downwardly into the material infeed assembly.

* * * * *